United States Patent [19]
Breinberg et al.

[11] Patent Number: 5,886,694
[45] Date of Patent: Mar. 23, 1999

[54] METHOD FOR AUTOMATICALLY LAYING OUT CONTROLS IN A DIALOG WINDOW

[75] Inventors: Steven Adam Breinberg, Sunnyvale; Marc Rene Keller, San Jose; Hannes Helmut Ruescher, Palo Alto; Hiroya Chiba, Sunnyvale, all of Calif.

[73] Assignee: Microsoft Corporation, Redmond, Wash.

[21] Appl. No.: 892,547

[22] Filed: Jul. 14, 1997

[51] Int. Cl.⁶ .................................................. G06F 3/14
[52] U.S. Cl. .......................... 345/340; 345/347; 345/342; 345/356
[58] Field of Search ..................... 345/340, 341, 345/342, 343, 344, 345, 3.46, 347, 339, 348, 349, 350, 351, 352, 353, 354, 355, 356, 326, 327, 328, 332, 333, 334; 348/563

[56] References Cited

U.S. PATENT DOCUMENTS

| | | |
|---|---|---|
| 4,860,218 | 8/1989 | Seator ..................................... 345/340 |
| 5,062,060 | 10/1991 | Kolnick ................................... 345/339 |
| 5,119,476 | 6/1992 | Texier ..................................... 345/340 |
| 5,416,900 | 5/1995 | Blanchard et al. . |
| 5,459,832 | 10/1995 | Wolf et al. ............................... 345/340 |
| 5,552,982 | 9/1996 | Jackson et al. . |
| 5,579,466 | 11/1996 | Habib et al. . |
| 5,757,364 | 5/1998 | Ozawa et al. ............................ 345/201 |
| 5,757,369 | 5/1998 | Ohsawa et al. .......................... 345/340 |
| 5,777,687 | 7/1998 | De Lange ................................ 348/563 |

*Primary Examiner*—Raymond J. Bayerl
*Assistant Examiner*—Steve Sax
*Attorney, Agent, or Firm*—Christensen O'Connor Johnson & Kindness PLLC

[57] ABSTRACT

A computer-based method of sizing and positioning controls within a window is disclosed. The method divides a window, and in particular a dialog window, into rectangular regions, referred to as frames. A logical description of the relative positions and sizes of the controls and frames within the dialog window is specified. The method automatically determines the coordinates of each control and positions the controls accordingly during execution of the computer program that is displaying the dialog window. The method is performed in two stages: a specification stage and a layout stage. In the specification stage, a dialog window is subdivided into multiple nested rectangular frames. The set of frames for a dialog window forms a hierarchical tree of frames. In the layout stage, the method traverses the tree of frames twice. The first traversal of the frame tree occurs in postorder sequence, and determines the minimum required size of each frame. The second traversal of the tree occurs in preorder sequence, selectively expanding or repositioning frames within the available space. When the method completes the determination for the Leaf Frames, the final coordinates of each control are known. The method then sets the coordinates of each control accordingly.

54 Claims, 25 Drawing Sheets

```
/* Part 1:  Define frame objects */
// Frame object definitions are indented to show hierarchy:
DLHorizFrame   root( *this ); // root's children are in horizontal relation
    DLLableBoxFrame   labelBox( m_labelBox ); //labelBox has 1 child
        DLHorizFrame   boxInterior( *this );
        // boxInterior's children are in horizontal relation
            DLVertFrame     radioButtons( *this );
            // radioButtons's children are in vertical relation
                DLCtrlFrame  fmFit( m_zoomFit );
                DLCtrlFrame  fm400( m_zoom400 );
                DLCtrlFrame  fm200( m_zoom200 );
                DLCtrlFrame  fm100( m_zoom100 );
                DLCtrlFrame  fm66( m_zoom66 );
                DLCtrlFrame  fm50( m_zoom50 );
                DLCtrlFrame  fm33( m_zoom33 );
            DLNumInputFrame   fmScaleInput( m_scaleInput );
    DLVertFrame   pushButtons( *this );
    // pushButtons's children are in vertical relation
        DLCtrlFrame    fmOk( m_okBtn );
        DLCtrlFrame    fmCancel( m_cancelBtn );
/* Part 2:  Build tree of frames */
// Again indented to show hierarchy:
root<<labelBox  << pushButtons;  // root's children are labelBox and pushButtons
    labelBox << boxInterior;  //labelBox's one child is boxInterior
        boxInterior << radioButtons << fmScaleInput
        // boxInterior's children are radioButtons and fmScaleInput
            radioButtons << fmFit << fm400 << fm200 << fm100 << fm66 << fm50 << fm33;
            // radioButtons has 7 children
    pushButtons << fmOk << fmCancel;  // pushButton's children are fmOk, fmCancel
/* Part 3:  Set specific frame attributes */
// Set other, non-default, desired attributes of any individual frames:
fmScaleInput.AddTopString( m_scaleLabel );  // add "Percent" to NumInput's top side
fmScaleInput.AddRightString( m_scalePercent );  // add "%" to NumInput's right side
fmScaleInput.SetWidthDigits( 3 );  // set NumberInput's width by the # of digits
/* Part 4: Perform layout */
root.Layout(2);  // performs layout calculation recursively on all frames;
```

*Figure 17*

METHOD FOR AUTOMATICALLY LAYING OUT CONTROLS IN A DIALOG WINDOW

FIELD OF THE INVENTION

The present invention relates to software user interfaces and, more particularly, to methods for sizing and positioning controls within a dialog window of a computer program.

BACKGROUND OF THE INVENTION

Computer programs that operate in a windowing environment commonly use dialog windows to present information and receive input from a user. One example of a popular windowing environment is the Windows®95 operating system, by Microsoft Corporation of Redmond, Wash.. Programs that execute on the Windows®95 operating system commonly include dialog windows containing one or more controls. Examples of these controls are push buttons, radio buttons, check boxes, and edit boxes. Static controls display or organize information, but do not receive user input. A label box control, which is made up of a rectangular border and a text label, is one example of a static control.

In order to create a dialog window, programmers specify the position and dimensions of each control within the window. In some operating systems, such as the Windows®95 operating system, a programmer creates a set of resource data that specifies the precise position and dimensions of each control. The coordinates and dimensions can be specified either in pixels or dialog units. The value of a dialog unit is operating system dependent. For example, in Windows 95, a dialog unit is a distance relative to the size of one text character.

The process of laying out a dialog window by specifying the coordinates and dimensions of each control can require considerable effort. In order to change a dialog window, a program developer may need to recalculate the coordinates of each control. When a dialog window is localized for use in other countries by translating it into different languages, additional work is required to reposition the controls of the dialog window for each version.

In addition, during execution of a computer program, the contents of a dialog window may change between multiple invocations of the window. When the control coordinates are specified prior to execution of the program, the layout of the dialog window does not change, even if the window's contents change.

It is desirable to have a mechanism that allows a program developer to specify the relative positions of the controls within the dialog window, without specifying precise coordinates or dimensions of each control. Preferably, such a mechanism will automatically calculate the coordinates of each control and position the controls correctly at the time the dialog window is displayed during execution of the program. The present invention is directed to providing such a mechanism.

SUMMARY OF THE INVENTION

In accordance with this invention, a computer-based method of sizing and positioning controls within a window, and specifically a dialog window, in a graphical user interface is provided. The method divides a dialog window into rectangular regions, referred to as frames, and specifies a logical description of the relative positions of the controls and frames within the dialog window. The method automatically determines the coordinates of each control and positions the controls accordingly during execution of the computer program that is displaying the dialog window. The method is performed in two stages: a specification stage and a layout stage. In the specification stage, a dialog window is subdivided into multiple nested rectangular frames. The set of frames for a dialog window forms a hierarchical frame tree. In the layout stage, the method traverses the frame tree twice, determining the size and position of each frame. When the method completes the determination of the leaf frames, the final coordinates of each control are known. The method then sets the coordinates of each control accordingly.

In accordance with other aspects of this invention, the frame tree includes multiple leaf frames, multiple composite frames, and exactly one root frame. A leaf frame has one or more associated controls enclosed within its borders. A composite frame has one or more child frames, which may be leaf frames or composite frames. All frames descend from the root frame, which is a composite frame enclosing all other frames.

In accordance with still other aspects of this invention, a leaf frame or a composite frame is one of a defined set of frame types. Each frame type has corresponding default rules for determining the size of the frame, and the size and position of the frame's child frames. A program employing the invention can call methods to specify one or more attributes from set of predefined attributes. The attributes specify size or positional relationships between frames.

In accordance with yet still other aspects of this invention, the method traverses the frames tree twice during the layout stage. The first traversal of the frame tree preferably occurs in postorder sequence, beginning at the leaf frames, and determines the minimum required size of each frame. The minimum size of a composite frame depends on the minimum size of its child frames. The second traversal of the frame tree preferably occurs in preorder sequence, beginning at the root frame, selectively expanding or repositioning frames within the available space, according to the type of frame and any specified attributes. The size and position of a frame depends on the size and position of its parent frame. The size and position of a control depends on the size and position of its corresponding frame. After determining the size and position of each control, the dialog window and its controls are displayed.

In accordance with further aspects of this invention, the set of attributes includes an attribute specifying that the child frames of a composite frame are to have the same width or height. The set of attributes also includes an attribute specifying that a frame is not to be expanded beyond its minimum size. The set of attributes also includes an attribute specifying that one or more child frames of a parent frame are to be expanded to fill the width or height of the parent frame.

In accordance with still further aspects of this invention, the border of each frame is optionally displayed in a corresponding color. Preferably, different colors are employed in order to improve the visibility of frames.

As will be readily appreciated from the foregoing description, a method of sizing and laying out controls within a dialog window performed in accordance with the invention provides a way of simplifying the task of developing and maintaining a computer program that includes dialog windows. The invention allows changes to be made to the content of the dialog window without requiring a program developer to recalculate control coordinates. An example of such changes is translation of text into different languages. After translation of text, the method of the invention automatically resizes and repositions controls within a dialog window, even if the text has changed in size.

In addition, the invention preferably determines the sizes and positions of each control each time the dialog window is created. Since the contents of a dialog window can change each time it is created, the invention customizes the appearance of the dialog window for each creation, thereby providing a more aesthetically pleasing user interface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 17 is a listing of exemplary program code that performs the frame specification to create the dialog window shown in FIG. 15A, in accordance with the invention;

DETAILED DESCRIPTION OF THE PREFERRED EMBODIMENT

The present invention provides a mechanism that allows a computer program having a graphical user interface (GUI) to display a window containing controls that are properly positioned and sized within the window. The mechanism includes program code that divides a window into rectangular regions, and specifies a logical description of the relative positions of the controls and regions. The invention further includes program code that automatically determines the precise coordinates of each control, and positions the controls accordingly during execution of the computer program that is displaying the dialog window.

The process of the invention is preferably performed in two stages: a specification stage and a layout stage. In the specification stage, a window, and in particular a dialog window, is subdivided into multiple rectangular regions, referred to as frames. The frames are nested, and each frame can contain zero, one, or more "child" frames within its boundaries. The complete set of frames for a dialog window forms a hierarchical tree of frames, wherein each frame encompasses all of its child frames. Each control in the dialog window has one corresponding frame enclosing the control. A frame has zero, one, or more associated controls. As used in this application, when a frame is described as "enclosing" a child frame or control, the boundaries of the child frame or control do not extend beyond the boundaries of the first frame.

In the layout stage, an autolayout engine traverses the tree of frames twice determining the final position and dimension of each frame, and therefore each control, within the dialog window. The first traversal of the frame tree occurs from the bottom to the top, in postorder sequence. The autolayout engine determines the minimum required size of the Leaf Frames, each of which corresponds to at least one control. The autolayout engine then continues up the frame tree, determining the minimum required size of each frame, based on its child frames and other requirements of the frame, as explained in further detail below.

After determining the minimum required size of each frame, the autolayout engine traverses the tree from top to bottom, in preorder sequence, selectively expanding or repositioning frames to fill available space. When the autolayout engine completes the determination for the Leaf Frames, the final coordinates of each control are known. The autolayout engine then sets the coordinates of each control accordingly.

Figure 1A:
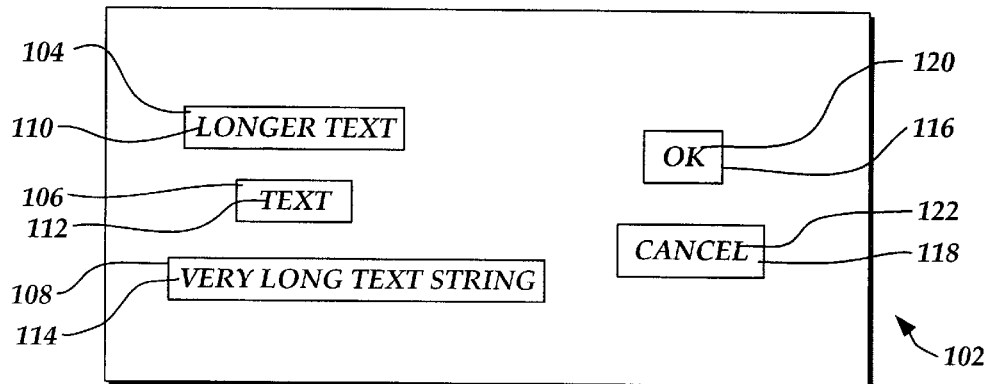
FIGS. 1A–D are pictorial representations of a dialog window at different stages during the process of the invention.

Prior to a more detailed description, a brief illustration of the process of the invention performed on a simple exemplary dialog window is provided. FIG. 1A illustrates the components of an exemplary dialog window 102 prior to employment of the present invention. The dialog window 102 contains a set of three controls 104, 106, and 108 positioned approximately vertically in relation to each other on the left side of the dialog window. Each of these three controls 104, 106, and 108 includes a corresponding text string 110, 112, and 114 that is displayed with its corresponding control. Check boxes, radio buttons, and static text are examples of controls that include text. The dialog window 102 also includes a pair of push-button controls, an "OK" push-button control 116 and a "Cancer" push-button control 118 positioned approximately vertically relative to each other and to the right of the first set of controls. Each of the push-button controls 116 and 118 has an associated text string 120 and 122, respectively, that is displayed within the corresponding push-button control.

Figure 1B:
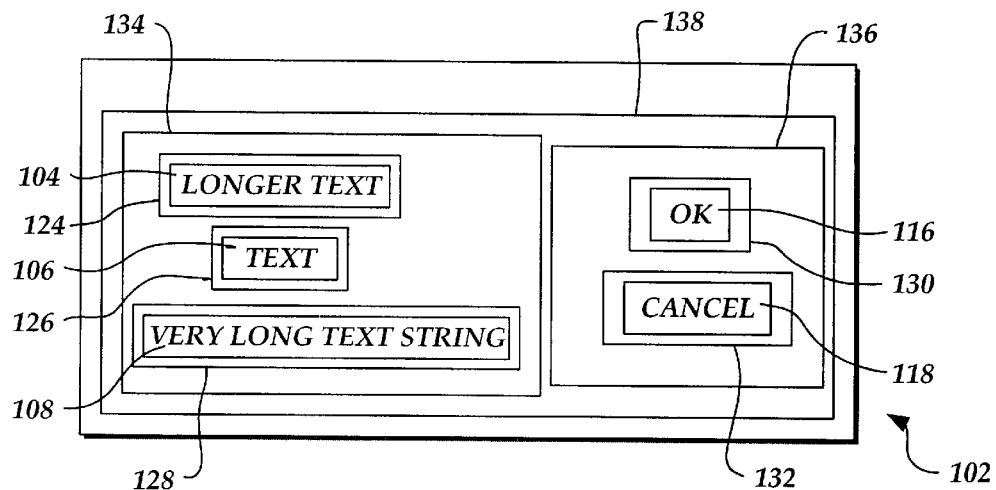

FIG. 1B illustrates the dialog window 102 of FIG. 1A, and shows a set of frames that are created in accordance with the present invention. A "Control Frame" is the innermost frame that encompasses a control. Each of the controls 104, 106, 108, 116, and 118 has a corresponding Control Frame 124, 126, 128, 130, and 132, respectively.

A "Vertical Frame" 134 encompasses the set of three Control Frames 124, 126, and 128 that are positioned vertically relative to each other. The Vertical Frame 134 is the "parent frame" of the three Control Frames 124, 126, and 128 contained therein. The three Control Frames 124, 126, and 128 are thus the "child frames" of the Vertical Frame 134. As explained in further detail below, a Vertical Frame specifies that its child frames are to be horizontally aligned and vertically spaced apart. A second Vertical Frame 136 contains the two Control Frames 130 and 132. The ordering of a Vertical Frame's children is significant. Child frames of a Vertical Frame are spaced apart from top to bottom. As depicted, the upper Control Frame 124 is the first child frame of the Vertical Frame 134, the mid Control Frame 126 is the second child frame, and the lower Control Frame 128 is the third child frame. This signifies that the three Control Frames 124, 126, and 128 are to be positioned in order, with the first child Control Frame 124 on the top.

A "Horizontal Frame" 138 contains the two Vertical Frames 134 and 136. A Horizontal Frame designates that its child frames are to be vertically aligned and horizontally spaced apart. The Horizontal Frame 138 specifies that the top borders of the Vertical Frames 134 and 136 are to be vertically aligned, so that both top borders have the same y coordinate position. The actual alignment is shown in FIG. 1D. As discussed below, a Horizontal Frame can also specify that the bottom borders or the vertical centers of its child frames are to be vertically aligned. The ordering of a Horizontal Frame's children is significant. Child frames of a Horizontal Frame are horizontally arranged from left to right. As depicted in FIG. 1B, the left most Vertical Frame 134 is the first child frame of the Horizontal Frame 138, and the right most Vertical Frame 136 is the second child. This signifies that the first Vertical Frame 134 is to be positioned to the left of the second Vertical Frame 136.

Figure 2:
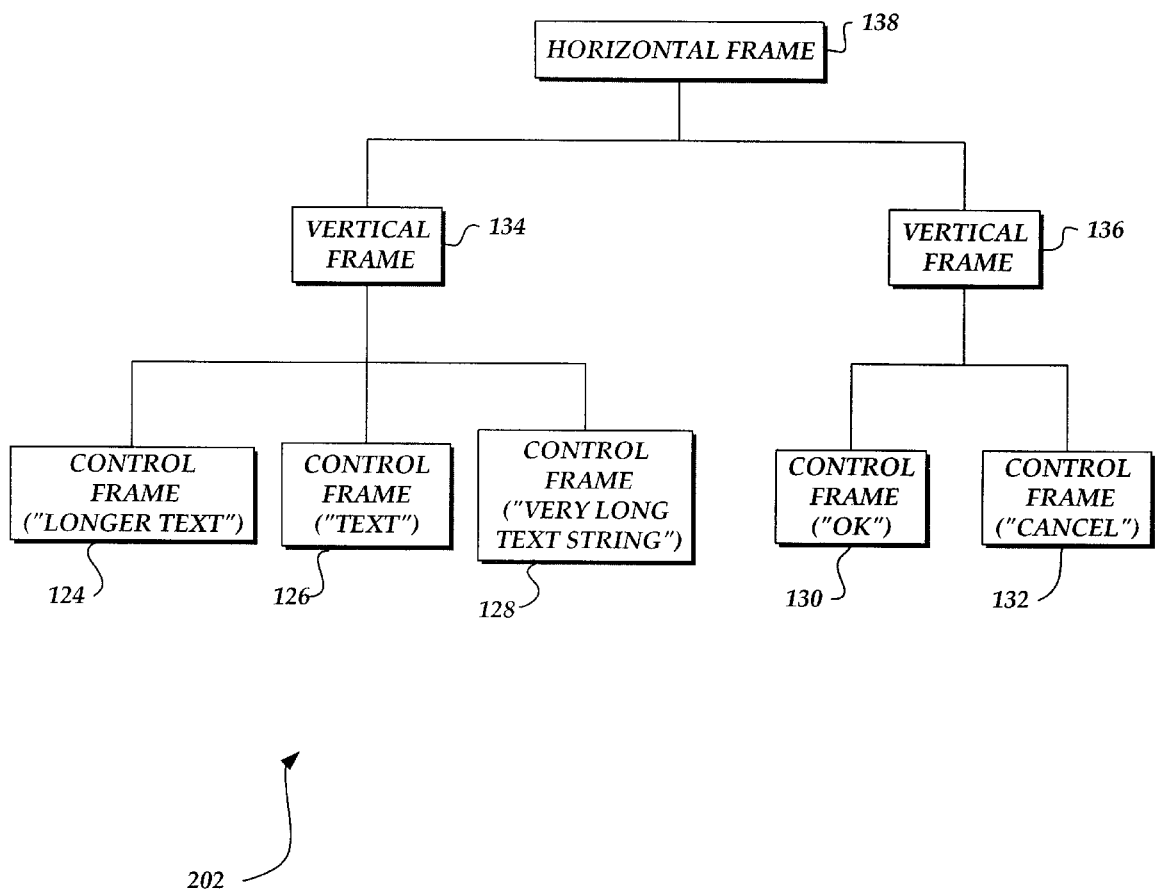
FIG. 2 illustrates a hierarchy of frames utilized in the creation of the dialog window shown in FIG. 1D, in accordance with the invention.

FIG. 2 illustrates a hierarchical diagram of the frame tree depicted in FIG. 1B and discussed above. As illustrated, the Horizontal Frame 138 is the "root" of the frame tree, and has two child frames: the left Vertical Frame 134 and the right Vertical Frame 136. The left Vertical Frame 134 has three child frames: the three Control Frames 124, 126, and 128. The right Vertical Frame 136 has two child frames: the two Control Frames 130 and 132.

In the preferred implementation of the present invention, each frame depicted in FIGS. 1B and 2 represents an object in an object-oriented programming paradigm. An object includes program code and data, the program code performing actions on the data of the object. For example, the data of a frame object includes the position and dimensions of the frame and the program code of the frame object includes code that adjusts the position and dimensions when necessary, in accordance with the invention. As discussed in further detail below, the specification of the frames that comprise the frame tree corresponding to a dialog window includes executing program code that creates each frame object and establishes references within each object, in order to define a hierarchical tree. In one actual embodiment of the invention, Horizontal Frame objects, Vertical Frame objects, and Control Frame objects are instances of respective classes that define the contents and behavior of the objects. The classes included in this embodiment are discussed in further detail below.

Each frame object includes program code that determines the position and dimensions of the frame and its child frames. For example, the three Control Frames 124, 126, and 128 contain program code that determines the minimum size of the frame according to the text string contained therein. Similarly, a Vertical Frame 134 or 136 contains program code that horizontally aligns its child frames. It is to be understood that, in the following discussion, actions performed "by" a frame refer to actions that are performed by the program code associated with the frame object in one actual embodiment of the invention. It should be readily understood by those skilled in the art of computer programming, and others, that alternative techniques for performing the process of the present invention are readily available.

Prior to displaying the dialog window shown in FIG. 1A, the mechanism of the present invention determines and sets the coordinates of each control. As discussed above, in accordance with the present invention, the frame tree is traversed from the bottom (leaves) of the tree to the top (root) of the tree. During this traversal, the minimum required size of each frame is determined. The minimum required size of a frame is referred to as the "constraints" of the frame. The constraints of a frame are based on the requirements of its associated control and the constraints of its child frames. In some situations, discussed below, the constraints of a frame are based on the constraints and requirements of its siblings as specified in its parent frame.

Figure 1C:
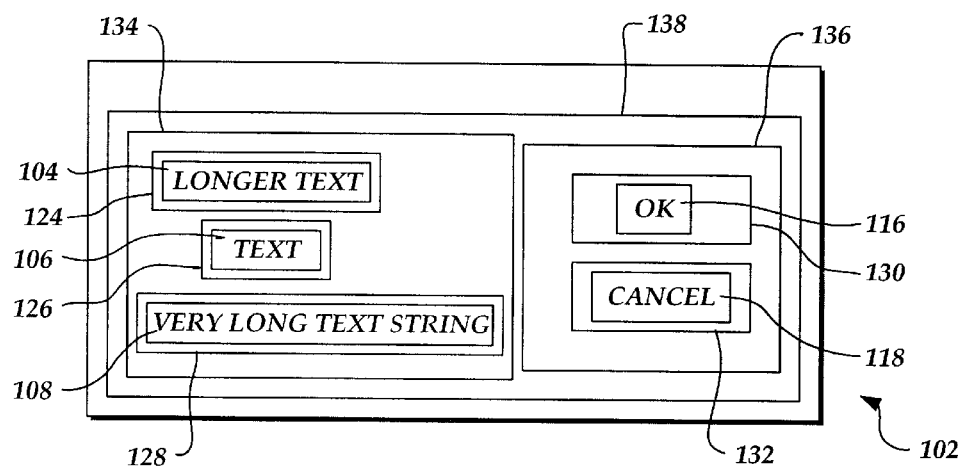
Figure 1D:
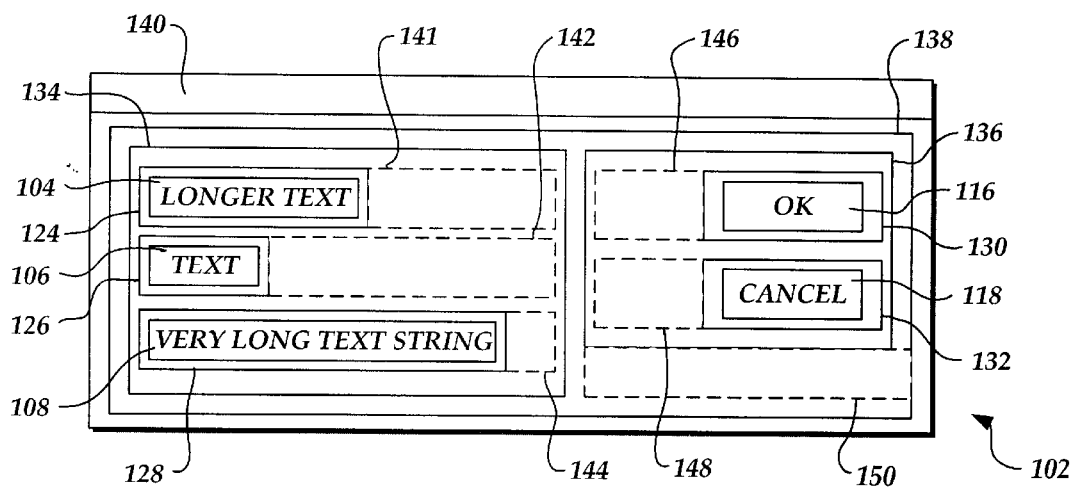

FIG. 1C illustrates the dialog window 102 and frames depicted in FIG. 1B after the steps of traversing the frame tree to calculate the constraints of each frame. It should be noted that in the practice of the invention, the dialog window 102 as depicted in FIGS. 1A, 1B, and 1C is never displayed. FIGS. 1A–1C are merely illustrative, and pictorially represent the calculated coordinates of the frames in stages during the practice of the invention.

The calculation of the constraints for each Control Frame 124, 126, 128, 130, and 132 is based, in part, on the constraints of each of their respective associated controls 104, 106, 108, 116, and 118. For example, as depicted, each control requires that its minimum size is capable of properly displaying the text contained therein. The Control Frame 128 is depicted having a width equal to the width required for the string, "Very long text string." Each of the three Control Frames 124, 126, and 128 on the left side of the dialog window are therefore sized accordingly, as shown in FIGS. 1B and 1C.

In one actual embodiment, when each Control Frame 124, 126, 128, 130, and 132 is created during the specification stage, the size of the Control Frame 128 is set to the minimum required size of its corresponding control. During the calculation of constraints, the constraints of each Control Frame 124, 126, 128, 130, and 132 are set to be its initial size. The constraints of the Control Frame 130 are further expanded, as discussed below.

The above-described adjustment of the three Control Frames 124, 126, and 128 correspond to "visiting" the three leaf nodes of the frame tree 202 corresponding to these Control Frames and illustrated in FIG. 2. The process of traversing the frame tree 202 continues by visiting the left Vertical Frame 134. Determining the constraints of the left Vertical Frame 134 includes determining the Vertical Frame's dimensions in order to enclose its three child frames 124, 126, and 128. FIG. 1C illustrates the Vertical Frame 134 after the determination of its constraints.

The postorder traversal of the frame tree 202 continues at the Control Frame 130. The dimensions of the Control Frame 130 are based upon the text displayed in the corresponding control 116, as described above. A similar determination of constraints is made for the Control Frame 132.

The traversal of the frame tree 202 next proceeds to visit the right Vertical Frame 136, which is the parent frame of the push-button Control Frames 130 and 132. In accordance with the invention, a Vertical Frame includes an optional attribute specifying that all of its child frames must have the same width. This attribute is automatically set when all child frames of a Vertical Frame have associated push-button controls. Therefore, while visiting the Vertical Frame 136 during the postorder traversal of the frame tree 202, the Vertical Frame 136 adjusts the dimensions of its child Control Frame 130 to match the width of the larger child Control Frame 132. The Vertical Frame 136 then adjusts its own dimensions to enclose both of its child frames. FIG. 1C shows the adjusted dimensions of the Vertical Frame 136 and its child Control Frames 130 and 132.

The postorder traversal of the frame tree 202 next continues by visiting the Horizontal Frame 138 that is the parent frame to the Vertical Frames 134 and 136. The Horizontal Frame 138 adjusts its dimensions to enclose its two child frames, as illustrated in FIG. 1C.

As discussed above, the frames of FIG. 1C are shown, for illustrative purposes, with spaces between them, where space may not actually exist. Additionally, frames may include attributes that specify margins or indentation. The handling of margins and indentation is discussed in further detail below.

Following the calculation of the minimum requirements for each frame of the frame tree, the mechanism of the invention resizes the dialog window to the minimum dimensions that allow the dialog window to enclose the root frame and an additional margin. Additionally, the dialog window must be wide enough to completely display its title in the title bar. The resized dialog window is illustrated in FIG. 1C. In FIG. 1D, the depicted dialog window width is constrained by a long title in the title bar 140.

The mechanism of the invention next performs a second traversal of the frame tree, in which the frames are selectively expanded. This second traversal of the frame tree is performed beginning at the root of the tree, in a top-down, preorder sequence. During this traversal, the Horizontal Frame 138 that is the root of the frame tree 202 expands its dimensions to fill the dialog window 102. FIG. 1D illustrates the dialog window 102 and frames depicted in FIGS. 1A–1C following the preorder traversal of the frame tree. As shown in FIG. 1D, the Horizontal Frame 138 is expanded to the dimensions of the dialog window 102, except for a small peripheral margin.

The Vertical Frames 134 and 136 also expand to fill the available space within their parent frame, which is the Horizontal Frame 138. The available space is all of the space except for a small peripheral margin. The three Control Frames 124, 126, and 128 do not expand during this traversal, but retain their previously determined size. The two Control Frames 130 and 132 also do not expand during this traversal. However, their position is adjusted to take into account the expansion and repositioning of their parent frame, which is the Vertical Frame 136. In particular, it is assumed, for illustrative purposes, that the specification of the Vertical Frame 136 includes an instruction to align the child Control Frames 130 and 132 toward the upper right corner of the Vertical Frame 136.

After the final determination of each Control Frame's coordinates, the mechanism of the present invention repositions and resizes the Control Frame's associated control within the dialog window to have the same position and size as the Control Frame. FIG. 1D depicts the final layout of the exemplary dialog window 102. The frames are shown in FIG. 1D for illustrative purposes only, and are not displayed in the actual dialog window.

Figure 3:
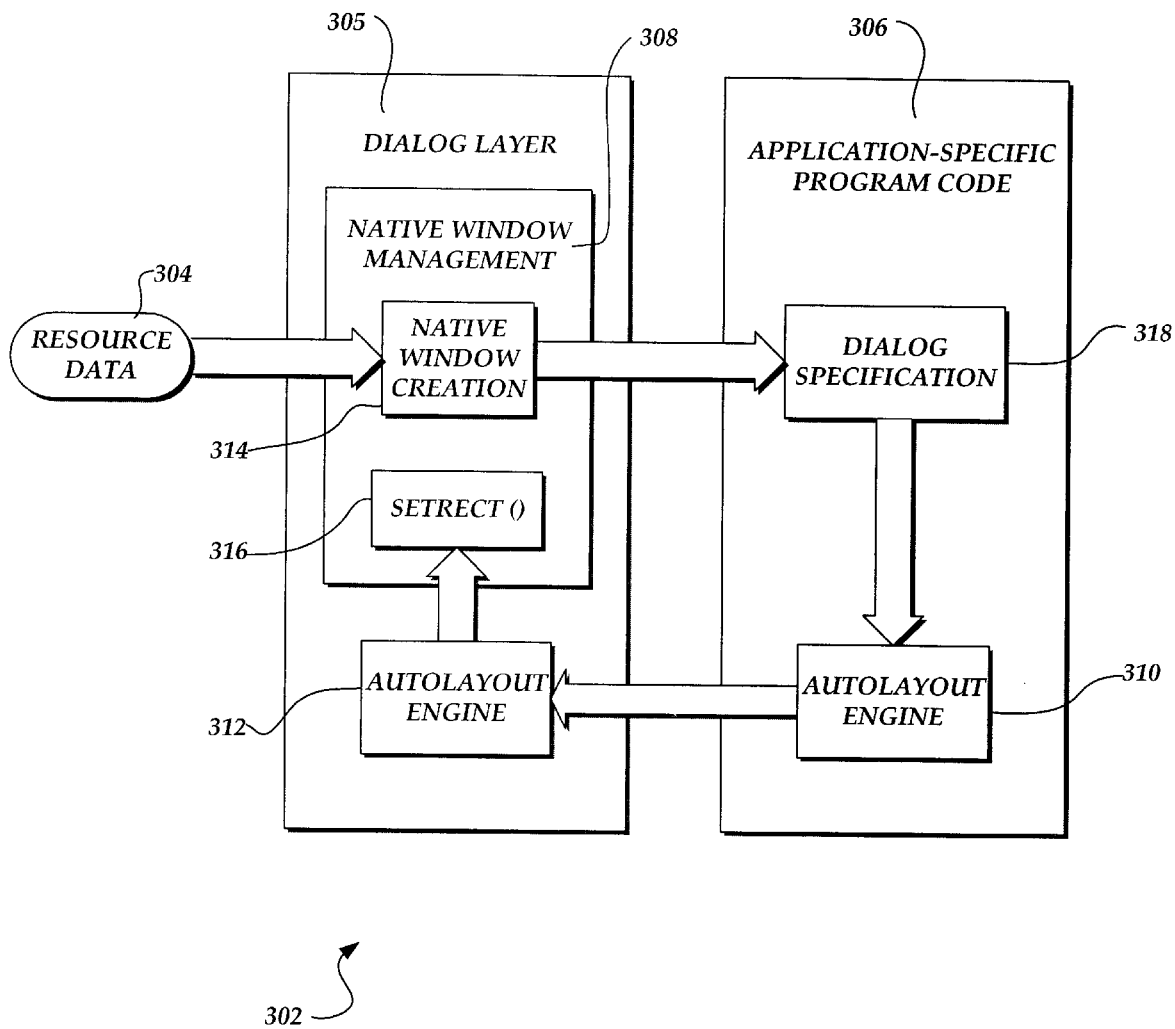
FIG. 3 is a block diagram of a computer program formed in accordance with the invention.

A portion of a computer program 302 formed in accordance with the invention for automatically laying out the contents of a dialog window is illustrated generally in FIG. 3. A set of resource data 304 contains data specifying the contents of each dialog window that is to be created by the computer program 302. The content and format of the data in the resource data is generally specified by the operating system or system software that creates the components of a graphical user interface. For example, in the Windows®95 operating system, the resource data includes attributes of each control within each dialog window, such as the type of control, the appearance of the control, and behavioral attributes of the control. The contents of resource data are well documented for common operating systems, and need not be discussed in further detail herein.

The computer program 302 includes a dialog layer 305 and application-specific program code 306. The dialog layer 305 includes program code that creates, destroys, and manipulates dialog windows and dialog controls. The dialog layer is general in nature, and is used to create and manipulate dialog windows and controls in different applications. Preferably, the dialog layer can be linked with application specific program code 308 from multiple applications without requiring changes to the code within the dialog layer 305.

The dialog layer 305 includes a native window management module 308 that interfaces with a native operating system to perform operations on dialog windows and controls. The native window management module includes a native window creation component and a SetRect() component 316. The native window creation component 314 creates dialog windows and dialog controls. The SetRect() component 316 sets the position and dimensions of each dialog control within its dialog window. The native window management module 308 may create software objects that serve as a layer between the native operating system and software components outside of the native window management module. For example, in one actual embodiment, the native window management module creates one software object for each native dialog control that is created within a dialog window. By allowing software components outside of the native window management module 308 to communicate with the software objects, the native window management module "hides" operating system specific details, and reduces the complexity of porting a computer program to different operating systems. Techniques for hiding operating system specific details are well known in the art of computer programming, and need not be discussed in further detail herein.

The application-specific program code 306 includes a dialog specification component 318 and an autolayout specification module 310. The dialog specification component 318 includes program code that specifies the software objects corresponding to each dialog control, as discussed above. The program code within the dialog specification component 318 is specific to one dialog window. The computer program 302 includes one or more dialog specification components 318, each dialog specification component corresponding to one dialog window within the program.

The computer program 302 controls the creation and display of each dialog window. For example, in one actual embodiment, when a user selects a menu item from a menu displayed within the computer program 302, the program causes a dialog window to be created and displayed. In Windows®95, the program 302 requests the operating system to create and display a dialog window. Prior to displaying the requested dialog window, the program calls the autolayout specification module 310.

The computer program 302 includes an autolayout specification module 310 for each dialog window that employs the present invention. The autolayout specification module 310 contains program code that is customized for its corresponding dialog window. The autolayout specification module 310 defines a set of frames that comprise the dialog window. The process of defining theses dialog frames is explained in further detail below.

After defining the frames that comprise the dialog window, the autolayout specification module 310 invokes an autolayout engine 312 in the dialog layer 305. The autolayout engine determines the coordinates of each frame defined by the autolayout specification module 310 as discussed above. The process that the autolayout engine 312 uses in this determination is described in further detail below. As discussed above, the autolayout engine 312 determines frame coordinates for multiple dialog windows within one computer program. The autolayout engine 312 can also be used by multiple computer programs.

After determining the coordinates of each frame that has an associated control, the autolayout engine 312 sets the coordinates and dimensions of the control. This is performed by invoking the SetRect() component 316. The SetRect() component, in turn, invokes the native operating system to correctly set the position and dimensions of the dialog control.

Figure 4:
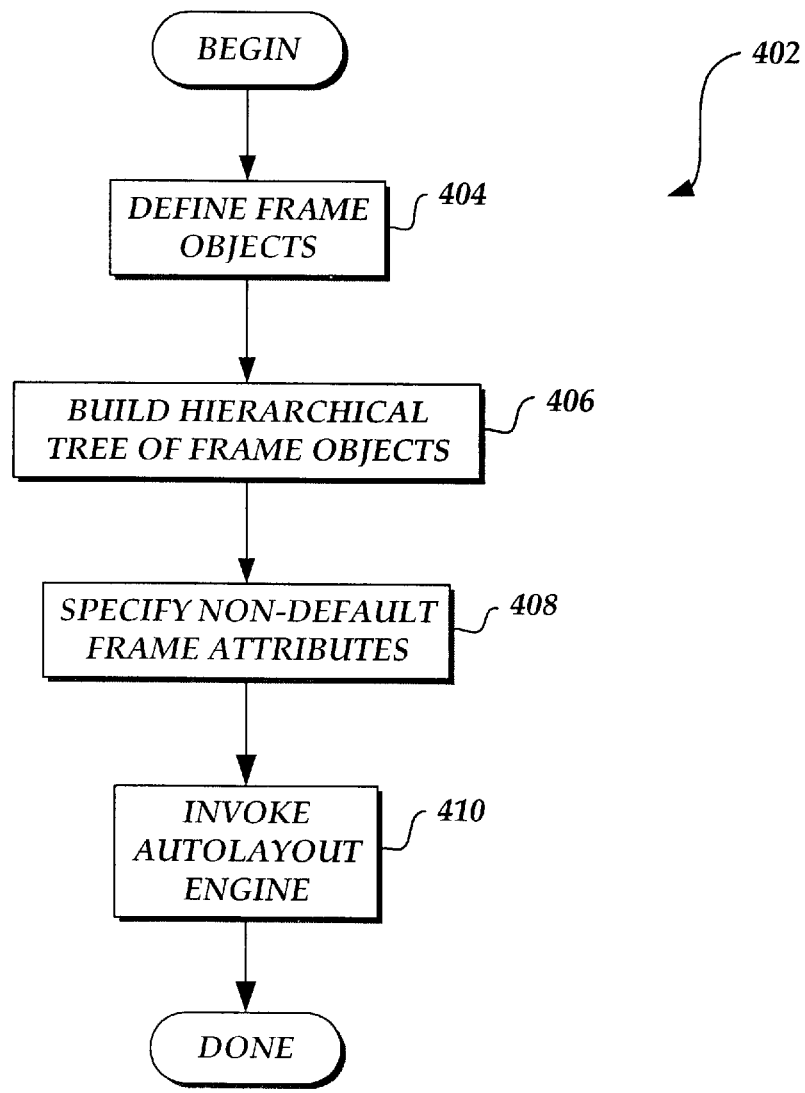
FIG. 4 is a flow diagram illustrating the specification of frame objects and controls in accordance with the invention.

FIG. 4 illustrates the process 402 of specifying the frames and frame attributes, as performed by the autolayout specification module 310 in accordance with the present invention. At step 404, the autolayout specification module defines and creates a plurality of frame objects that represent rectangular regions in a dialog window. The present invention includes the definition of a set of frame types. An explanation of each frame type is provided below. One type of frame, a Control Frame, is briefly discussed here.

A Control Frame has an associated control within the dialog window. The determination of the position and dimensions of a Control Frame is dependent upon the type of control associated with the frame. The creation of each Control Frame object includes passing to the newly created Control Frame object an identifier that links the Control Frame with the corresponding control. In one actual embodiment of the invention, the identifier links each Control Frame with a corresponding control object created by the dialog specification component 318 (FIG. 3). The control object contains a second identifier that links the control object with the dialog window control. The second identifier is included in the resource data, in accordance with the operating system requirements. In an alternative embodiment, the identifier passed to the newly created Control Frame object is the identifier of the corresponding control, as specified in the resource data. As should be understood by one skilled in the art of computer programming, and others, alternative techniques for linking a Control Frame with its corresponding control are available.

The step 404 includes making calls into the autolayout engine to determine the initial dimensions of each frame that has an associated control. The initial dimensions are based upon the minimum requirements of the associated control. For example, a Control Frame that has an associated control displaying a text string is sized to display the complete text string. If the associated control has additional graphic elements, such as a check box, the Control Frame is sized to include the check box. In the dialog window 102 illustrated in FIG. 1B, the "Cancel" Control Frame 132 is shown after the performance of step 404. The initial dimensions of the "Cancel" Control Frame 132 are calculated in order to accommodate the text string, "Cancel." In one actual embodiment, a push-button Control Frame has a predetermined minimum width. Preferably the predetermined minimum width is sufficient to enclose a pushbutton control that contains the text string, "Cancel." In such an embodiment, resizing the "Cancel" Control Frame 132 at step 404 is not necessary.

At step 406, the autolayout specification module builds a hierarchical tree of the frames created at step 404. As stated above in the discussion that accompanies FIGS. 1A–D, the hierarchical tree of frames, or frame tree, is specified such that the rectangular region corresponding to each frame encloses the rectangular regions corresponding to its child frames. One frame is the root of the frame tree, and encompasses all of the frames that descend from it.

As discussed in further detail below, each type of frame has an associated set of attributes and program code that perform the processing of the autolayout engine. In situations where attributes and behaviors other than the default ones are required in order to achieve a desired dialog window layout, the autolayout specification module may include program instructions that specify the non-default frame attributes. At step 408, the autolayout specification module specifies the non-default frame attributes.

At a step 410, the autolayout specification module invokes the autolayout engine 312 (FIG. 3) to perform the process of determining the coordinates of each frame and to set the coordinates of each control.

Figure 5:
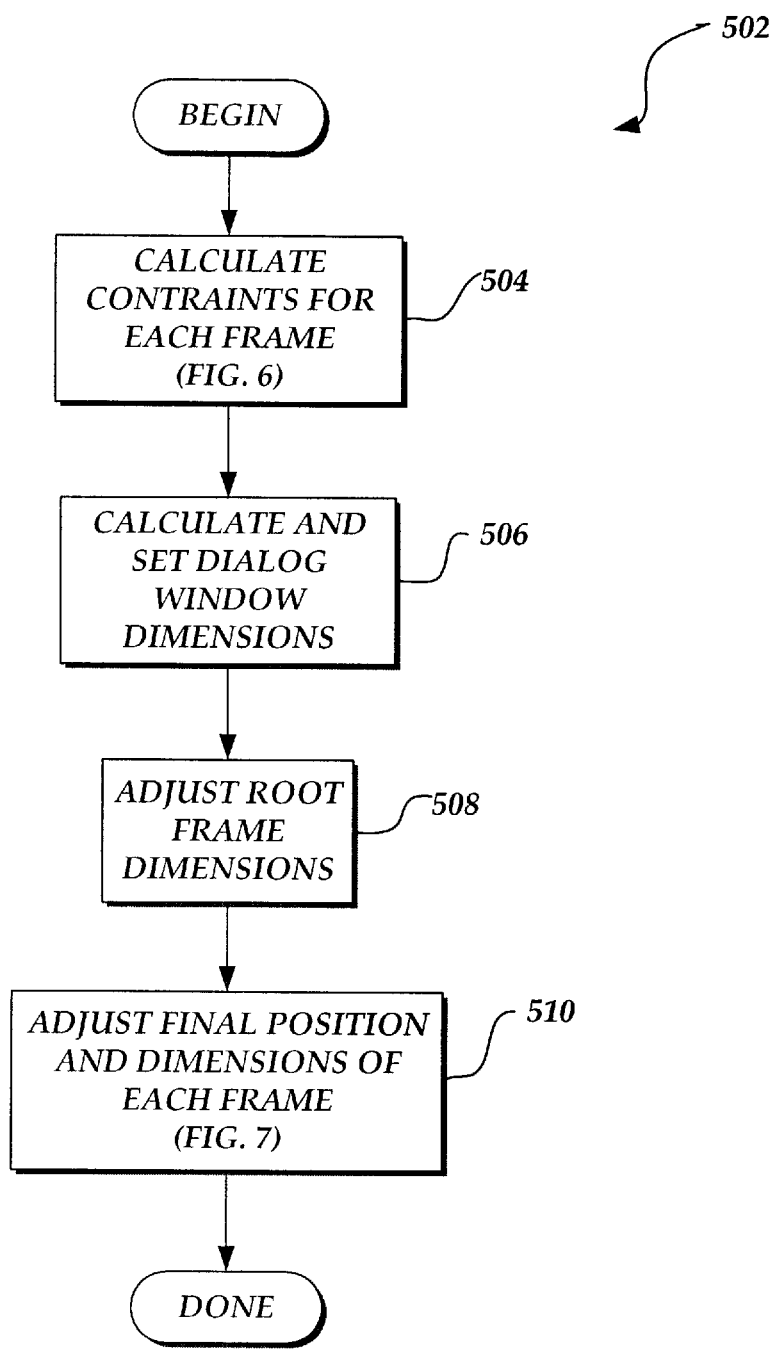
FIG. 5 is a flow diagram illustrating the process of automatically laying out the frame objects within a dialog window, in accordance with the invention.

FIG. 5 provides a high level illustration of the autolayout process 502 performed by the autolayout engine 312 (FIG. 3). At step 504, the autolayout engine determines the constraints of each frame in the frame tree. The step of calculating the constraints for each frame is performed by traversing the frame tree from bottom to top, in postorder sequence. As explained in further detail below, the constraints on each frame are partially based upon the constraints of its descendent frames.

At step 506, the autolayout engine determines the dimensions of the dialog window and sets the window size accordingly. The dialog window dimensions are determined to be the minimum size required to contain the root frame and a margin. An exception to this is made if a wider dialog window is necessary to accommodate a long title. The autolayout engine calculates the dialog window width to display the title without truncation.

At step 508, the autolayout engine expands the width of the root frame, if there is room for expansion within the dialog window. This only occurs if the dialog window is constrained by the length of its title, as discussed above. In an alternative mechanism, a dialog frame serves as a root frame, and contains the title bar 140 (FIG. 1) as well as all other frames of the frame tree. In such an embodiment, the steps 506 and 508 of calculating and setting the dialog window dimensions and adjusting the root frame dimensions are performed within steps 504 and 510.

At step 510, the autolayout engine determines and selectively adjusts the final position and dimensions of each frame. As explained in further detail below, the step 510 is performed by traversing the frame tree from top to bottom, in preorder sequence. Therefore, during the step 510, the coordinates of each frame depend upon the coordinates of its parent frame and sibling frames.

Figure 6:
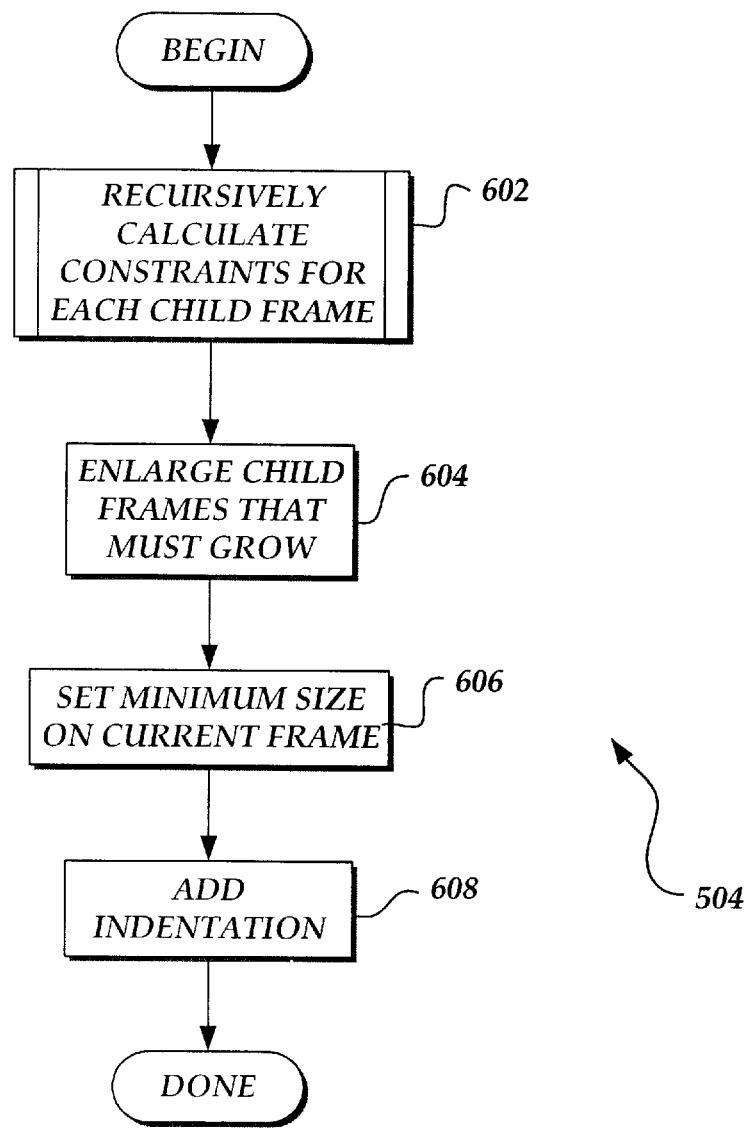
FIG. 6 is a flow diagram illustrating the process of calculating the constraints on the frame objects within a dialog window, in accordance with the invention.

FIG. 6 illustrates in further detail the step 504 of calculating the constraints for each frame in the frame tree. The calculation of constraints for a frame is incremental. That is, during step 504, the autolayout engine calculates the constraints for each frame at least one time. The autolayout engine may recalculate the constraints for a frame one or more times. In accordance with the present invention, a recalculation of constraints for a frame may determine that the minimum required size for one or both dimensions of a frame is greater than the previously calculated constraints. A recalculation of constraints never reduces the minimum required dimensions of a frame.

The calculation of constraints is performed by traversing the frame tree in postorder sequence, that is, from the leaf nodes to the root node of the tree. In one actual embodiment of the invention, the traversal of the tree and the calculation of constraints is performed recursively. Beginning at the frame that is the root of the frame tree, at step 602, the autolayout engine recursively "visits" each child frame of the root frame and calculates the constraints for the currently visited child frame prior to performing step 604 for the root frame. The recursion at step 602 causes the autolayout engine to calculate the constraints of every frame on the frame tree, in postorder sequence. The frame that is currently being visited is referred to as the "current frame." After recursively calculating the constraints for each child frame, at step 604, the autolayout engine enlarges each child frame that must be enlarged based upon the attributes and types of the child frame and the current frame.

FIGS. 1B–C and 2 illustrate the performance of step 604. When the Vertical Frame 136 is visited during the calculation of constraints, a recursive visit to the "Cancel" Control Frame 132 does not expand the Control Frame 132. As discussed above, the "Cancel" Control Frame 132 and its corresponding push-button control 118 are initially sized to accommodate the text string, "Cancel." The sibling ("OK") Control Frame 130 also does not expand during its visit. However, the Vertical Frame 136, which is the parent of the "OK" Control Frame 130 and the "Cancel" Control Frame 132, includes a specification that all of its child frames must have the same width. Therefore, at step 604 during the visit to the Vertical Frame 136, the autolayout engine enlarges the "OK" Control Frame 130 to equal the width of its sibling ("Cancel") Control Frame 132.

Step 604 is selectively performed as a result of a specification that the child frames of the current frame must have the same width or height. When all child frames of a Vertical Frame are Control Frames that have an associated push-button control, the mechanism of the invention automatically sets an attribute that all children must have the same width. The autolayout specification may also explicitly set this attribute by specifying that the child frames must have the same width. This specification is described in further detail below.

At step 606, the autolayout engine determines the constraints of the current frame and sets minimum sizes. Each frame has requirements for determining its constraints. The size of each frame depends upon the sizes of its child frames. For example, a Horizontal Frame must have a width that is no less than the total width of all its child frames. The calculation of constraints for each frame of the frame tree is dependent upon the characteristics and requirements of the frame. A detailed discussion of the characteristics and requirements of each frame type is provided below.

At step 608, the autolayout engine adds any required indentation to the current frame. Indentation is an attribute of each frame, and is selectively specified at step 408 (FIG. 4) in the autolayout specification. Each frame has zero, one, or more levels of indentation. At step 608, the autolayout engine expands the current frame horizontally by the specified number of levels. A frame having one or more levels of indentation is further adjusted during the second traversal of the frame tree, as explained below in the discussion that accompanies step 708 of FIG. 7.

Figure 7:
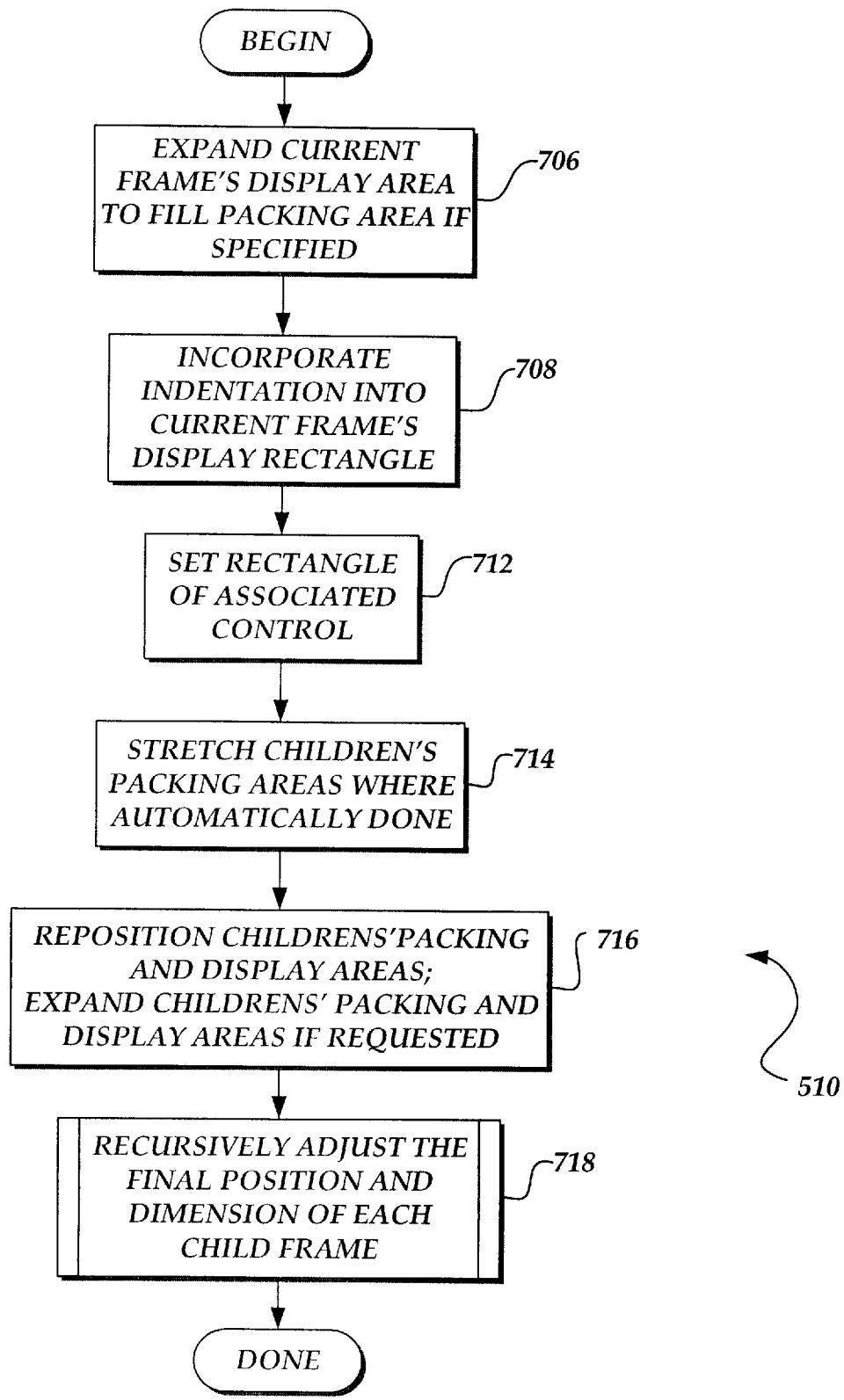
FIG. 7 is a flow diagram illustrating the process of calculating the final position of each frame object and control within a dialog window, in accordance with the invention.

FIG. 7 illustrates in further detail the step 510 (FIG. 5) of adjusting the final position and dimensions of each frame. As discussed above, the steps illustrated in FIG. 7 are performed during a preorder (top-down) traversal of the frame tree. Therefore, the series of steps illustrated in FIG. 7 are performed for each node of the frame tree, beginning with the root node as the "current frame." Prior to discussing FIG. 7, a brief explanation of "packing" areas and "display" areas is provided.

In accordance with the invention, each frame has an associated "packing" area and a "display" area. The packing area represents the rectangular area that is reserved exclusively for the frame. The display area is the rectangular area that the frame actually occupies at a point in time. The display area never extends beyond the boundaries of the packing area. During the preorder traversal of the frame tree, the autolayout engine selectively expands the packing area of each frame. The corresponding display area of each frame is also selectively expanded within the packing area. In FIGS. 1B and 1C, the rectangles representing each frame indicate the display area of the frame. After the step 504 (FIG. 5) of determining the constraints of each frame in the frame tree, the packing area of each frame is equal to its corresponding display area. As discussed below, during the step 510 of adjusting the final position and dimensions of each frame, the autolayout engine selectively expands the packing area of each frame in one or both dimensions. In FIG. 1D, the dashed lines 141, 142, 144, 146, and 148 indicate the packing areas corresponding to each Control Frame 124, 126, 128, 130, and 132, respectively. The solid lines representing each frame indicate the corresponding display area.

At step 706, the autolayout engine determines whether there exists a specification to expand the display area of the current frame to fill the frame's packing area. A specification to fill the packing area is selectively made during the step 408 (FIG. 4) of specifying non-default frame attributes. If a specification to fill the packing area is made at step 408, a flag value representing this designation is set and later tested at step 706. A specification to fill the packing area designates that expansion is to be made in the horizontal direction or the vertical direction.

If a specification to fill the packing area in either the horizontal or vertical direction has been made, at step 706, the autolayout engine expands the display area of the current frame to fill the current frame's packing area. FIG. 1D illustrates the Horizontal Frame 138 and the Vertical Frames 134 and 136 after the performance of step 706, expanding each of these frames to fill their respective packing areas in the horizontal direction.

Following step 706, control proceeds to step 708, where the autolayout engine incorporates indentation into the current display area. As discussed above, each frame has zero or more levels of indention. If one or more levels of indention are specified for the current frame, at step 708, the current frame's display area is indented the specified number of levels, and reduced in width by an amount equal to the indentation. As discussed above, at the step 608 during the calculation of constraints, the autolayout engine increases the display area in width the specified number of levels. Therefore, the increase in width at step 608 and the decrease in width at step 708 result in a net change of zero in the current frame display area's width.

At step 712, the autolayout engine sets the rectangle of the current frame's associated control. In one actual embodiment, all Control Frames have an associated control. Some other types of frames, discussed below, also have an associated control. When the current frame is a frame that has an associated control, the autolayout engine sets the rectangle of the associated control, based upon the current coordinates of the current frame. Setting the rectangle of a control includes invoking an operating system call and specifying the rectangle's coordinates.

Some frame types have an associated layout characteristic specifying that the packing areas of its child frames must be expanded to the height or width of the parent packing area. For example, when a Vertical Frame is a parent frame, the autolayout engine horizontally expands the packing areas of its child frames to match the horizontal dimension of the parent Vertical Frame. Since a child frame of a Vertical Frame cannot have a second child frame to its left or to its right within the parent Vertical Frame, the entire horizontal space within the parent Vertical Frame is reserved for the child frame. This is illustrated in FIG. 1D. The Control Frame 124 has an associated packing area that expands in the horizontal direction to the boundaries of its parent frame, the Vertical Frame 134. The expanded packing area is indicated by the dotted lines 141. The expansion of the packing area associated with the Control Frame 124 is performed during step 714, when the Vertical Frame 134 is the current frame. Similarly, during the same step, the packing areas of the Control Frames 126 and 128 are expanded horizontally to the width of its parent frame, the Vertical Frame 134. The expanded packing areas of the Control Frames 126 and 128 are indicated by the dotted lines 142 and 144, respectively. When the Vertical Frame 136 is the current frame, at step 714, the packing areas 146 and 148 corresponding to the child frames, Control Frames 130 and 132, respectively, are similarly expanded horizontally. The packing areas belonging to child frames of a Horizontal Frame are expanded vertically, in an analogous manner. In FIG. 1D, the expanded packing area of the vertical frame 136 is indicated by the dotted lines 150.

At step 716, the autolayout engine resets the packing and display areas belonging to the child frames of the current frame, according to alignment or expansion specifications. These specifications are made at step 408 (FIG. 4) of the autolayout specification. The packing and display areas may also be positioned according to default settings of the current frame.

For example, the default setting of a Vertical Frame specifies that its child frames must be left aligned and gravitate toward the top left of the frame, as margins and indentations allow. In FIG. 1D, when the Vertical Frame 134 is the current frame, at step 716, the child frames 124, 126, and 128 are left aligned and positioned as close to the left and top borders of the Vertical Frame as allowable, within the restrictions of the margin settings.

For illustrative purposes, the alignment setting of the Vertical Frame 136 in FIG. 1D specifies that the child frames are to be positioned toward the top right corner. As discussed in further detail below, different alignment specifications are available for aligning the child frames of a parent frame. Additionally, an autolayout specification can indicate that a child frame does not obey the alignment and expansion specifications pertaining to its parent frame. This is also explained in further detail below.

At step 718, the autolayout engine recursively adjusts the final position and dimensions of each child frame of the current frame. If the current frame is a Leaf Frame, there is no recursion at step 718, and the process returns up a level in the frame tree to the parent frame, descending again to the next child frame, if any. In this manner, the autolayout engine traverses the entire frame tree, following a preorder sequence, wherein the series of steps illustrated in FIG. 7 is performed for each frame of the frame tree.

The above discussion accompanying FIGS. 1–7 describes generally the components and the process of the present invention. The invention further includes descriptions of frame types that are available to create a frame tree corresponding to a dialog window. The frame type determines the layout mechanisms employed within the autolayout engine during the step 504 of calculating constraints for each frame and the step 510 of adjusting the final position and dimensions of each frame, as described in FIG. 5. Each frame type also has an associated set of characteristics that can be specified in the step 408 of defining non-default frame attributes, illustrated in FIG. 4. Following are detailed descriptions of each frame type as defined in one actual embodiment of the invention. Prior to the detailed description of the frame types, a brief explanation of the organization and relationships between the frame types is provided.

The invention utilizes an object-oriented paradigm, in which a class defines a set of attributes and methods. An object of the class includes the attributes and methods of the class. A method comprises program code, and is analogous to a function that can be invoked on a particular object. A "subclass" of a class may be defined, wherein the subclass "inherits" the attributes and methods of the "superclass." The inherited attributes and methods may be modified, or new attributes and methods may be added to the class. An object of the subclass correspondingly obtains the attributes and methods of the subclass. A hierarchy including classes, subclasses, and objects is useful to organize and understand the different types of frame objects that are included in the present invention.

In one actual embodiment of the invention, each frame type has a corresponding frame class. The frame class defines a set of default frame characteristics and a set of methods that specify layout characteristics. In addition, the actual embodiment includes "abstract" frame classes. Abstract frame classes do not correspond to actual frames that are created in the autolayout specification. Rather, they define characteristics and methods that are inherited by subclasses of the abstract class. This technique, common in object oriented programming, allows a method to be defined once, wherein the method is available to all subclasses of the abstract class.

In the autolayout specification, a method invocation includes a designation of frame and a method. Additionally, some methods require that one or more arguments are passed in the invocation.

Figure 8:
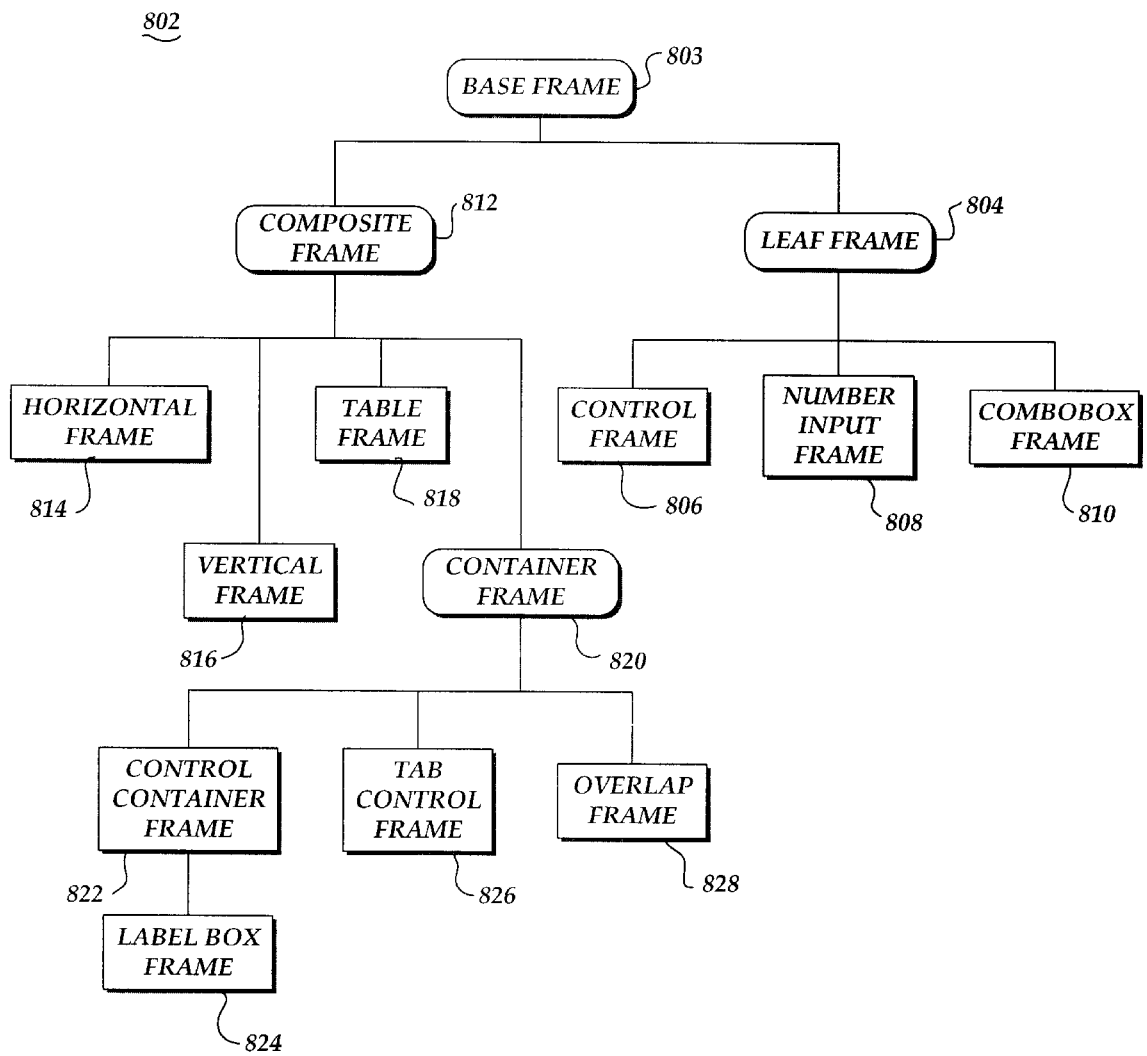
FIG. 8 illustrates the class hierarchy of frame objects in accordance with the invention.

FIG. 8 illustrates a frame class hierarchy 802 that is defined in one actual embodiment of the invention. The rectangles with rounded corners represent abstract frame classes. The rectangles with square corners represent frame types that are selectively utilized in the autolayout specification. The following is a description of the frame classes provided in one actual embodiment of the invention. In the discussion below, invocation of a method includes specification of a target frame and a method. For example, the method invocation framex.SetMargin (10)

invokes the SetMargin() method on a target frame named "framex."

Base Frame Class

The "Base Frame" class 803 is an abstract class and is the ancestor class of all frames. The methods defined in the Base Frame class are inherited by all other classes. The Base Frame class defines the following methods:

ExpandToFillHorizontal(), ExpandToFillVertical(). These methods cause the target frame to expand to fill the space allotted for it, in the dimension specified, at step 706. Specifically, the display area of the frame is expanded to the width or height of the packing area.

DontExpandHorizontal(), DontExpandVertical(). At step 714, when the packing areas of the current frame's child frames are selectively expanded, frames that have had this method invoked are not expanded. These methods do not suppress the expansion at step 706, discussed in reference to the ExpandToFillHorizontal() and ExpandToFillVertical() methods.

Indent(). This method causes the frame to be indented to the right one or more levels. An argument to this method specifies the number of indentation levels. A level is equivalent to the width of a check box bitmap plus an amount of space between the check box and the text of a check box control.

In response to an invocation of the Indent() method, the mechanism of the invention performs necessary adjustments to the target frame in two steps. At step 608 (FIG. 6) in the calculation of constraints for the target frame, the autolayout engine expands the frame horizontally by the amount required to accommodate the designated number of indentation levels. At step 708 in the preorder traversal of the frame tree, the autolayout engine moves the frame's display area to the right by the amount of the indentation space required. It also subtracts the same amount of indentation space from the width of the display area. As a result of these two steps, the display area is adjusted to allow for the proper indentation space.

SetMarginXX(). This method sets the margin for frames that are child frames of Horizontal or Vertical Frames.

In other situations, the margin is ignored. The argument specifies the size of the margin. "XX" specifies the unit of measurement, and is replaced by "DU," "Char," or blank. "DU" indicates dialog units. "Char" specifies character units. If "XX" is blank, the argument indicates pixels. If this method is not called, a predetermined default margin value is used. Preferably, the default margin value conforms to operating system user interface guidelines. In one actual embodiment, the default margin value is six dialog units.

Leaf Frame Class

The "Leaf Frame" class 804 is an abstract subclass of the Base Frame class 803. The Leaf Frame class is a superclass of all frames that can become leaves in a frame tree corresponding to a dialog window. All of the frames that are instantiated from the subclasses of the Leaf Frame class have an associated control. The Leaf Frame class defines the following methods:

AddLeftString(), AddTopString(), AddRightString(): These methods attach a text string control to the left, top, or right side, respectively, of the frame.

SetWidtbXX, SetHeightXX(): These methods specify the width and height, respectively, of the frame. "XX" specifies the units as discussed above for the SetmarginXX method. When SetWidthXX() is called on a Control Frame having an associated static string control, the height of the frame is also implicitly set, since setting the width also determines the number of lines the string requires.

SetWidthRsrc(), SetHeightRsrc(): This method sets the width or height of the frame to the current dimension of the frame's control. This may be a value specified in the resource data.

SetWidthCtrlID(): This method sets the frame width based on a text string in the resource data. An argument designates the text string's identifier.

The above-described methods defined in the Leaf Frame class set the frame size at the time they are called, at step 408 (FIG. 4) in the autolayout specification. They change the initial sizes determined at the step 404 of defining and creating the frames.

Leaf Frame Subclasses

The Leaf Frame class has three subclasses: a "Control Frame" class 806, a "Number Input Frame" class 808 and a "ComboBox Frame" class 810. Frames instantiated from each of these three subclasses of the Leaf Frame class always have at least one associated control, and are always leaf nodes in a frame tree. In particular, a Control frame, a Number Input frame, or a ComboBox Frame can have zero, one, or more associated string controls in addition to a "primary" control. The associated string controls are positioned to the left, to the right, or above the primary control associated with the frame. A Control Frame is used for all frames that have an associated control other than a number input control, a combo box control, and controls that may contain other controls, as discussed below. The dimensions of a Control frame depend upon the type of its associated control. The Control Frame class defines the following methods:

SetHeightLines(): This method is invoked only when the associated control is an edit popup, a static popup, or a text list box. Each of these controls includes one or more lines of text. The method changes the frame's height by specifying the number of lines that must be displayed within the control.

SetWidthToFitPreexistingltems(): This method is invoked only when the associated control is an edit popup, a static popup, or a text list box. This method causes the frame to assume a width that tightly fits the text strings already contained in the list or dropdown control. Since the list of items in a control can vary between invocations of the dialog window, this method can cause the corresponding control and, in turn, the dialog window to have different dimensions between invocations of the dialog window.

SetLeftAdjustXX(), SetRightAdjustXX(), SetTopAdjustXX(), SetBottomAdjustXX(): These methods are employed to specify size information for frames with a corresponding control that has more than one size. For example, an edit popup control appears as an edit box, but may also display a list box below the edit box. The autolayout engine determines sizes and positions based on the edit box, but when calling the operating system, it passes in a size based on the combination of edit box and list box. These methods specify the difference in size between the control used in the autolayout and the dimensions that are passed to the operating system. If SetHeightLines() is called on a control frame with a corresponding popup control, SetBottomAdjustXX() does not need to be called.

Frames instantiated from the Number Input Frame class 808 have an associated number input control. They may also have associated string controls that are located above, to the left, or to the right of the number input control. A number input control is a control that allows a user to enter numeric strings. The Number Input Frame class defines the following method:

SetWidtbDigits(): This method specifies the width of the associated number input control. An argument specifies the number of digits that must fit in the control.

Frames instantiated from the ComboBox Frame class have an associated combo box control. A combo box control combines an edit box and a list box. The ComboBox Frame class defines the following method:

SetHeightLines(): This method specifies the height of the associated control. An argument specifies the number of lines in the list box portion of the control.

Composite Frame Class

The Composite Frame class 812 is an abstract subclass of the Base Frame class 803. It is the ancestor class of all frame classes that have child frames in a frame tree. The methods of the Composite Frame class are used to specify aspects that are related to child frames. The Composite Frame class defines the following methods:

<<(): This method, referred to as the "frame insertion operator," adds a child frame to its parent frame. For example, the following method invocation adds three child frames to a frame having the name "ParentFrame," in the specified order:

ParentFrame<<ChildFrame1<<ChildFrame2<<ChildFrame3

Figure 9A:
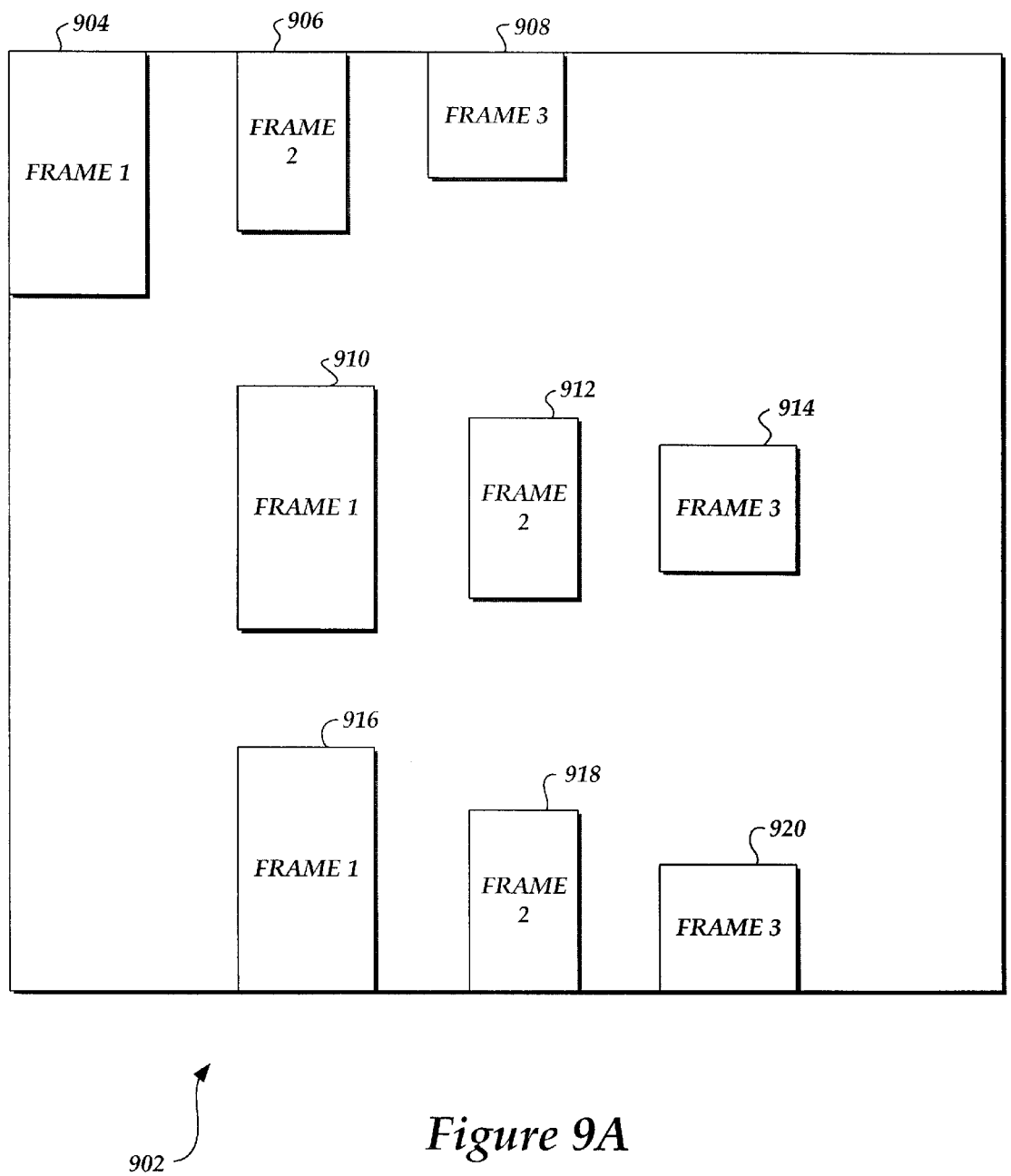
FIG. 9A is a block diagram of a Horizontal Frame illustrating the alignment of child frames in accordance with the invention.

AlignChildrenNW(), AlignChildrenN(), AlignChildrenNE (), AlignChildrenW(), AlignChildrenCenter(), AlignChildrenE(), AlignChildrenSW(), AlignChildrenS(), AlignchildrenSE(): These methods specify a direction in which a frame may align its child frames. The directions can be one of the eight basic compass directions (North, Northwest, Northeast, South, Southwest, Southeast, West, and East) and center. Unless specified otherwise, all child frames are clustered closely together with "directional gravity" pulling them to align in one of these nine directions. FIG. 9A illustrates the effect caused by invocation of three of these methods on a Horizontal Frame 902. The set of child frames 904, 906 and 908 illustrates the result of invoking AlignChildrenNW() on the Horizontal Frame 902. The top borders of the child frames 904, 906 and 908 are vertically aligned with each other, and the frames are pulled toward the top left corner of the Horizontal Frame 902. AlignChildrerNW() is preferably the default alignment. The set of child frames 910, 912 and 914 illustrates the result of invoking AlignChildrenCenter() on the Horizontal Frame 902. The vertical centers of the child frames 910, 912 and 914 are aligned with each other and with the vertical center of the Horizontal Frame 902. The set of child frames 916, 918 and 920 illustrates the result of invoking AlignChildrenS() on the Horizontal Frame 902. The bottom borders of the child frames 916, 918 and 920 are vertically aligned with each other, and the frames are pulled toward the bottom left corner of the Horizontal Frame 902. FIG. 9A depicts three alternative sets of frames, for illustrative purposes. As will become clear from the description of Horizontal Frames below, a Horizontal Frame can not include more than one of these sets of frames.

Figure 9B:
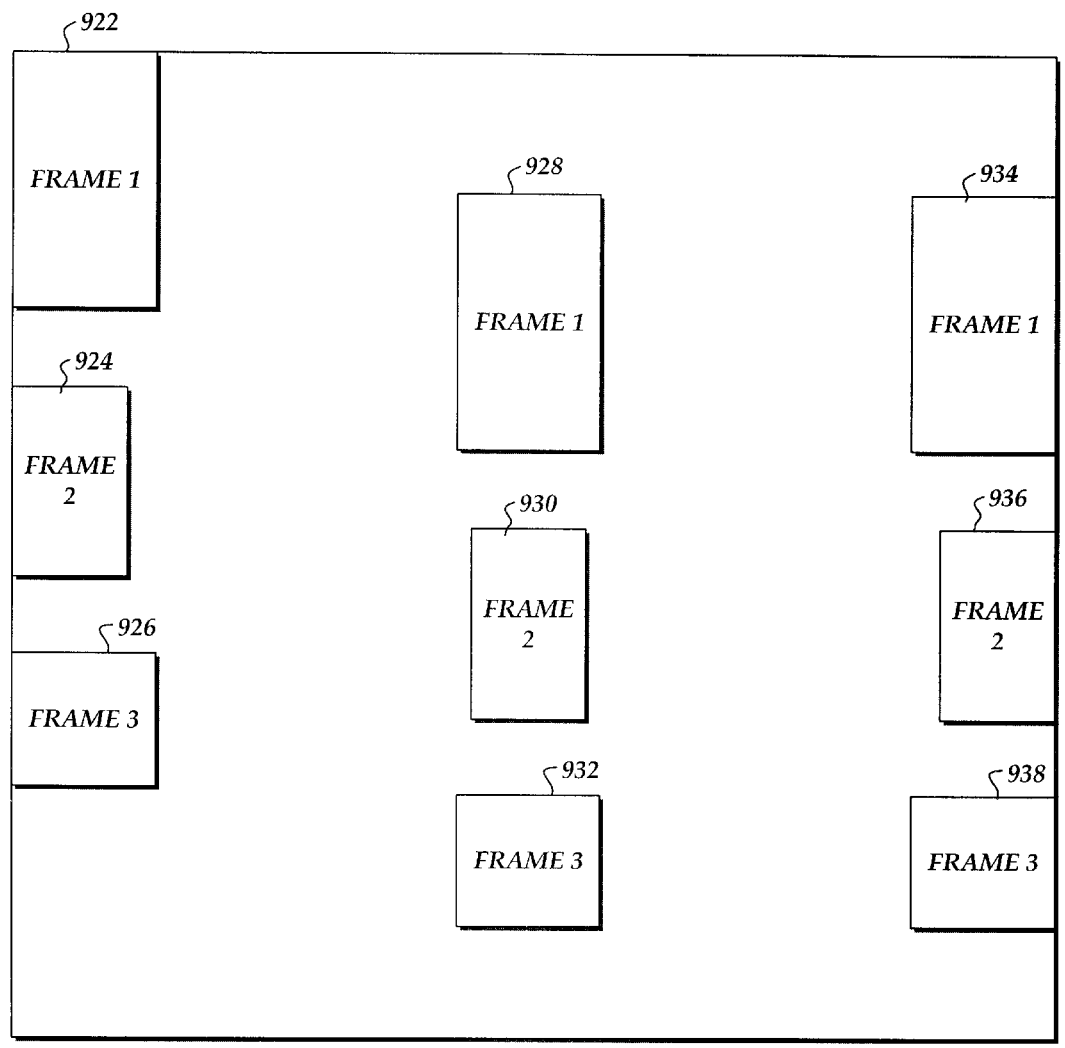
FIG. 9B is a block diagram of a Vertical Frame illustrating the alignment of child frames in accordance with the invention.

FIG. 9B illustrates the effect caused by invocation of three of these methods on a Vertical Frame 921. The child frames 922, 924 and 926 illustrate the result of invoking AlignChildrenNW() on the Vertical Frame 921. The left borders of the child frames 922, 924 and 926 are horizontally aligned with each other, and the frames are pulled toward the top border of the Vertical Frame 921. The child frames 928, 930 and 932 illustrate the result of invoking AlignChildrenCenter() on the Vertical Frame 921. The horizontal centers of the child frames 928, 930 and 932 are horizontally aligned with each other and with the horizontal center of the Vertical Frame 921. The child frames 934, 936 and 938 illustrate the result of invoking AlignChildrenE() on the Vertical Frame 921. The right borders of the child frames 934, 936 and 938 are aligned with each other, and the frames are pulled toward the right border of the Vertical Frame 921. FIG. 9B depicts three alternative sets of frames, for illustrative purposes. As will become clear from the description of Vertical Frames below, a Vertical Frame can not include more than one of these sets of frames.

ExpandChildrenToFillHorizontal(), ExpandChildrenToFillVertical(): These methods cause the target frame's child frames to expand in the specified direction up to the target frame's border. An argument passed in the method indicates how the child frames are to be expanded. An argument of "SAME_SIZE" specifies that the child frames are to have the same size in the specified direction. An argument of "PROPORTIONATE" indicates that the child frames are to be expanded proportionately. An argument of "SAME_DELTA" indicates that the child frames are to be increased by the same amount in the specified dimension.

If the DontExpandHorizontal() or DontExpandVertical() method has been invoked on any of the child frames, those child frames do not expand in the designated direction in response to an ExpandChildrenToFillHorizontal() call, or ExpandChildrenToFillVertical() call, causing the sibling children to expand further in order to fill the space.

SameWidthChildren(), SameHeightChildren(): These methods cause all child frames (except for those child frames on which the corresponding method, DontExpandHorizontal() or DontExpandVertical(), has been called) to expand to the size of the largest sibling frame in the designated direction. This expansion occurs during the step 604 (FIG. 6) of enlarging child frames that must grow, during the calculation of constraints. This method may cause the target frame to expand at step 606, in order to accommodate the newly expanded child frames.

Horizontal Frame Class

A Horizontal Frame contains child frames that are vertically aligned and horizontally spaced apart. At step 714 (FIG. 7), each child frame's packing area height is set to the parent Horizontal Frame's display area height. Each child frame of a Horizontal Frame has a corresponding margin. By default, the margin corresponding to the first (leftmost) frame is set to zero. If all child frames are Control Frames having associated push-button controls, the SameWidthChildren() method is automatically invoked. At step 606 (FIG. 6), during the calculation of constraints, the autolayout engine determines the minimum frame width of a Horizontal Frame to be equal to the total width of its child frames and their corresponding margins.

Figure 10:
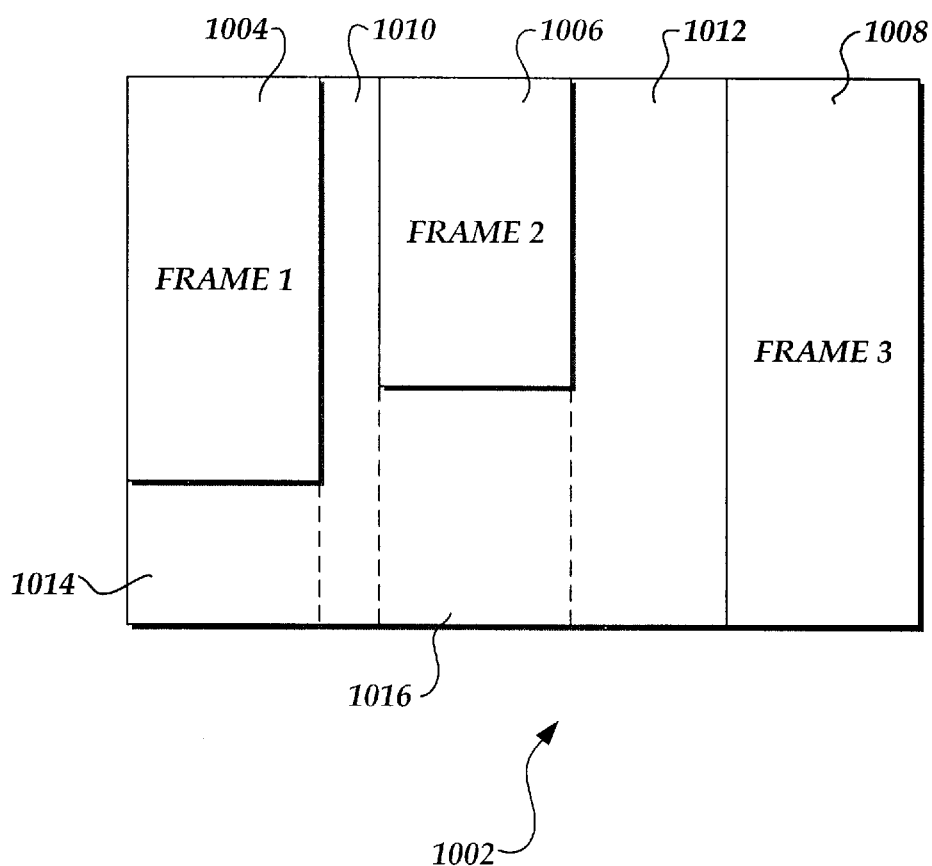
FIG. 10 is a block diagram illustrating a Horizontal Frame and its child frames in accordance with the invention.

FIG. 10 illustrates a Horizontal Frame 1002 having three child frames 1004, 1006, and 1008. The child frame 1006 has an associated horizontal margin 1010. The child frame 1008 has an associated horizontal margin 1012. A horizontal margin refers to the margin between horizontally spaced-apart frames in a Composite Frame. The horizontal margin associated with each child frame is the margin to the left of the child frame. The first (leftmost) child frame has a default margin equal to zero. FIG. 10 illustrates the packing areas 1014 and 1016 of the two child frames 1004 and 1006, respectively, after the step 714 of expanding the child frame's packing area, as discussed above. There is no space to vertically expand the packing area of the child frame 1008 within the Horizontal frame 1002.

At step 606, when the Horizontal Frame 1002 is the current frame, the minimum size of the Horizontal Frame is calculated to be the frame as depicted in FIG. 10. The width is equal to the total width of the child frames 1004, 1006, and 1008, and the horizontal margins 1010 and 1012. The height of the Horizontal Frame 1002 is set to be the height of the largest child frame. The Horizontal Frame class 814 (FIG. 8) defines the following methods:

SetChildrenMarginXX(): This method sets the horizontal margin for all of the Horizontal Frame's child frames to the amount indicated by an argument to the method. The first child frame's margin is set to zero. "XX" can be null, or "DU," as discussed for the SetMarginXX() method. Invoking SetChildrenMarginX() on the Horizontal Frame 1002 in FIG. 10 at step 408 (FIG. 4) sets the horizontal margin 1010 and the horizontal margin 1012 to the specified amount. Alternatively, the autolayout specification module may call the SetMarginXX() method with the child frame 1006 as the target frame to individually set the horizontal margin 1010, and again call SetMargin() with the child frame 1008 as the target frame to individually set the horizontal margin 1012, as follows:

Frame2.SetMargin (10)
Frame3.SetMargin (15)

The above method calls set the horizontal margin 1010 to be 10 pixels and the horizontal margin 1012 to be 15 pixels.

Figure 11:
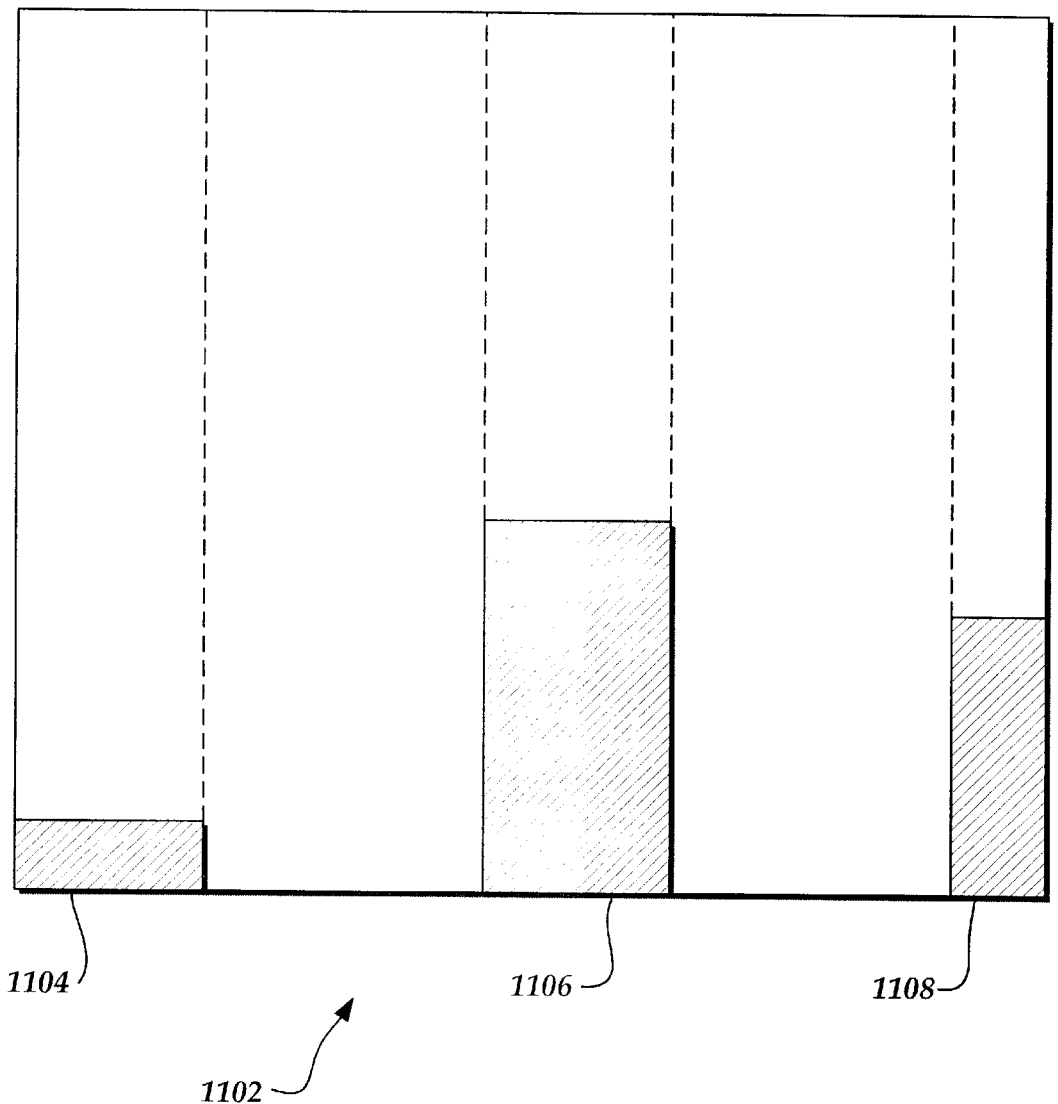
FIG. 11 is a block diagram of a Horizontal Frame illustrating one option for aligning child frames.

DistributeChildren(): This method causes the child frames of the target frame to repel each other. FIG. 11 illustrates a Horizontal Frame 1102 having three child frames 1104, 1106, and 1108, and shows the effect of invoking the DistributeChildren() method on the Horizontal Frame 1102 in combination with invocation of the method AlignChildrenS(). The child frames are moved against the bottom (South) border of the Horizontal Frame 1102 and also distributed to the maximum distance allowable within the left and right borders of the Horizontal Frame. A call to DistributeChildren() overrides any margins associated with the child frames and sets horizontal margins between child frames to an equal width. The distribution of children as a result of the DistributeChildren() method occurs at step 716 (FIG. 7).

Vertical Frame Class

A Vertical Frame contains child frames that are horizontally aligned and vertically spaced apart. At step 714 (FIG. 7), the packing area width of each child frame is set to the Vertical Frame's display area width. Each child frame of a Vertical Frame has a corresponding margin. The default margin corresponding to the first (topmost) child frame is set to zero. If all child frames of a Vertical Frame are Control Frames having an associated push-button control, the SameWidthChildren() method is automatically invoked. At step 606 (FIG. 6), during the calculation of constraints, the autolayout engine determines the minimum frame height of a Vertical Frame to be equal to the total height of all of its child frames and their corresponding margins. The Vertical Frame class 816 (FIG. 8) defines the following methods:

SetChildrenMarginXX(): This method sets the vertical margin for all of the Vertical Frame's child frames to the amount indicated by an argument to the method. It is similar to the method having the same name defined by the Horizontal Frame class.

DistributeChildren(): This method causes the child frames of the target frame to repel each other, in a manner similar to the DistributeChildren() method defined by the Horizontal Frame class.

Table Frame Class

The Table Frame class 818 (FIG. 8) is another subclass of the Composite Frame class. It defines frames having children that are positioned as a table, in rows and columns. A Table Frame's child frames are inserted in row-major order.

Figure 12:
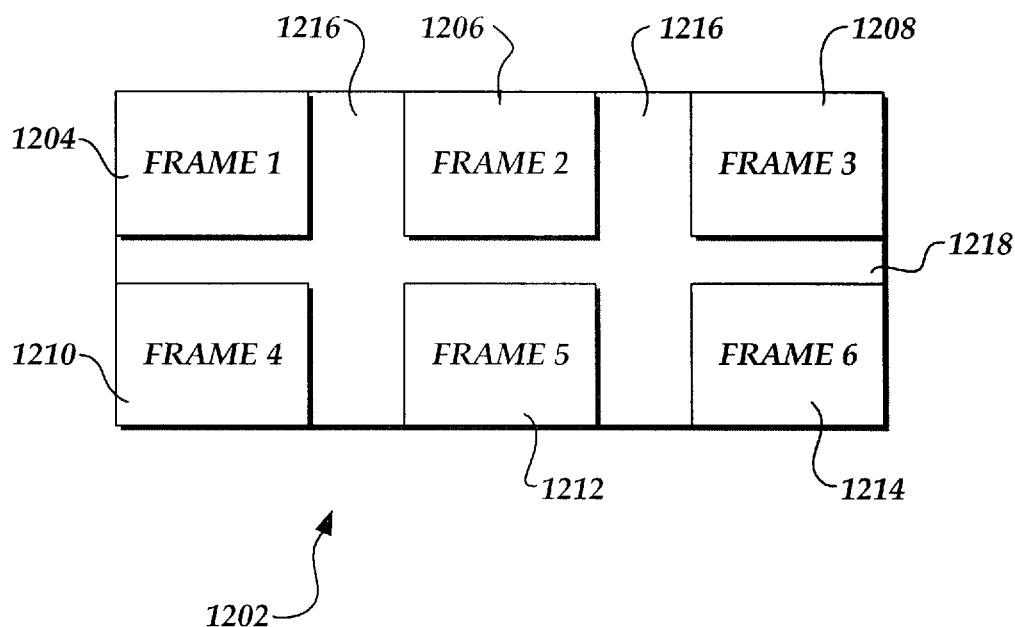
FIG. 12 is a block diagram illustrating a Table Frame and its child frames.

FIG. 12 illustrates a Table Frame 1202 having six child frames 1204, 1206, 1208, 1210, 1212, and 1214. The Table Frame 1202 has an associated horizontal margin 1216 between each column of frames, and a vertical margin 1218 between each row of frames. Each horizontal margin has the same width, and each vertical margin has the same height. The Table Frame class defines the following methods:

SetHorizontalMarginXX(), SetVerticalMarginXX(): These methods set the horizontal margin and the vertical margin, respectively. "XX" can be null or "DU," as described in the SetMarginXX method.

Skip(): This method creates a blank child in the Table Frame. For example, the following invocation of the Table Frame's frame insertion operator inserts the child frames 1204, 1206, 1208, 1210 and 1214, leaving a blank space where frame 1212 is shown.

Tableframe<<Frame1<<Frame2<<Frame3<<Frame4;
Tableframe.Skip();
Tableframe<<Frame6;

A Table Frame combines some of the features of a Horizontal Frame with some features of a Vertical Frame. For example, the width of a Table Frame is equal to the total width of all of the columns within the Table Frame plus the total width of the horizontal margins. The height of a Table Frame is equal to the total height of all rows within the Table Frame plus the total height of the vertical margins. During the calculation of constraints, the height of each row is set to be the height of the tallest child frame within the row. Correspondingly, the width of each column is set to be equal to the widest child frame within the column.

Container Frame Class

The Container Frame class 820 (FIG. 8) is an abstract subclass of the Composite Frame class and is a superclass of all frame classes that "contain" their child frames within a perimeter of margins. A frame instantiated from a subclass of the Container Frame class has a margin comprising a left, right, top, and bottom margin, each of which can have a zero value. Container Frame class defines the following methods:

SetLeftMarginXX(), SetRightMarginXX(), SetTopMargin(), SetBottomMarginXX(), SetPerimeterMarginXX(): These methods set the left, right, top, bottom and perimeter margins, respectively. The perimeter margin includes the left, right, top, and bottom margins.

SetPerimeterMargin() therefore sets all four margins. "XX" can be null or "DU," as described in SetMarginXX() method.

Control Container Frame Class

The Control Container Frame class 822 is a subclass of the Container Frame class 820 and defines a frame having an outer rectangle and an inner rectangle, with a and margin between the outer and inner rectangles. A child frame occupies the inner rectangle. A control occupies at least a portion of the margin between the rectangles, such that the outer perimeter of the control is the same as the outer rectangle, or border, of the Control Container Frame. In an alternative embodiment, the margin is defined as being the area between the control and the inner rectangle.

Label Box Frame Class

Figure 13:
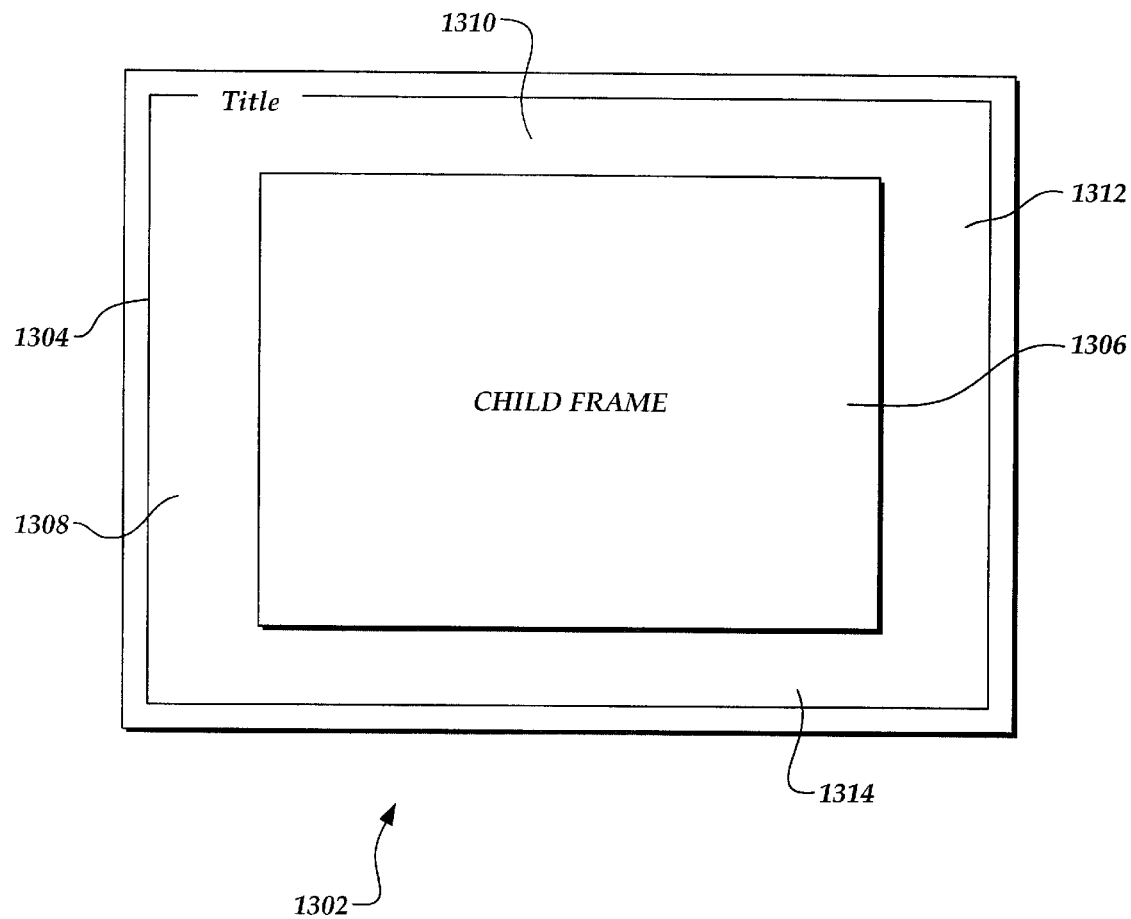
FIG. 13 is a block diagram illustrating a Label Box Frame and its child frame.

The Label Box Frame class 824 is a subclass of the Control Container Frame class and defines a frame having a label box control within the frame's margin and one child frame within the Label Box Frame's inner rectangle. FIG. 13 illustrates a frame instantiated from the Label Box Frame class. The Label Box Frame 1302 has an associated label box control 1304 within the margin of the Label Box Frame. The Label Box Frame's margin includes a left margin 1308, a top margin 1310, a right margin 1312, and a bottom margin 1314. At step 606 (FIG. 6) in the calculation of constraints for each frame, the minimum width of the Label Box Frame is determined to be the sum of the widths of the child frame 1306, the left margin 1308, and the right margin 1312, if this value is sufficient to accommodate the Label Box Frame's title. If the width of the Label Box Frame's title is greater than the sum of the widths of the child frame 1306, the left margin 1308, and the right margin 1312, the minimum width of the Label Box Frame is determined to be the width of the title plus a small amount of additional space. Similarly, the height of the Label Box Frame is calculated to be the total height of the child frame 1306, the top margin 1310, and the bottom margin 1314.

Tab Control Frame Class

Figure 14:
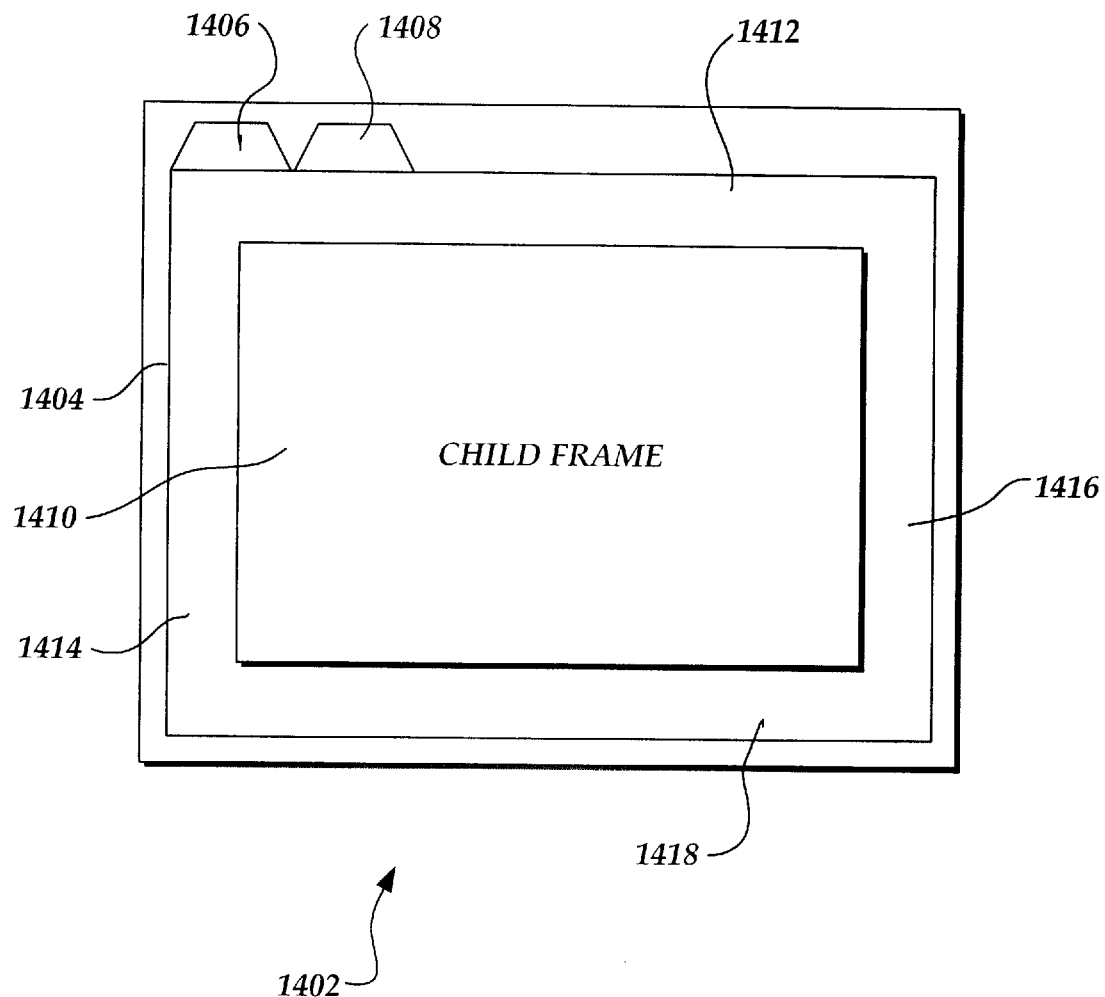
FIG. 14 is a block diagram illustrating a Tab Control Frame created in accordance with the invention.

The Tab Control Frame class 826 (FIG. 8) is another subclass of the Container Frame class. A Tab Control Frame has a tab control as its associated control. It has one or more overlapping child frames, only one of which contains visible controls at a time. FIG. 14 illustrates a Tab Control Frame 1402 having an associated tab control 1404. The tab control includes two tabs 1406 and 1408, each tab corresponding to one child frame. The Tab Control Frame 1402 has a child frame 1410 contained within the top margin 1412, left margin 1414, right margin 1416, and bottom margin 1418 of the Tab Control Frame 1402. A second child frame (not shown) overlays the first child frame 1410. At step 606 (FIG. 6), the autolayout engine determines the width of a Tab Control Frame to be equal to the width of its widest child frame plus the Tab Control Frame's left and right margins. It also determines the frame height to be equal to the total height of the frame's tallest child frame, the Tab Control Frame's top and bottom margins, and the tab control's tabs.

Overlap Frame Class

The Overlap Frame class 828 (FIG. 8) is another subclass of the Container Frame class. The child frames of an Overlap Frame overlap each other. The Overlap Frame is similar to the Tab Control Frame in the determination of its width and height. FIG. 18B (described in detail below) illustrates an Overlap Frame named lowerO 1888 containing a Control Frame named fmTruetypeText 1886 and an additional Control Frame (not shown). The fmTrueTypeText frame has an associated static text control 1838. Only one of the associated static text controls is displayed at any time. The autolayout engine determines the minimum height and width of the Overlap Frame to enclose the largest child frame in each dimension.

Figure 15A:
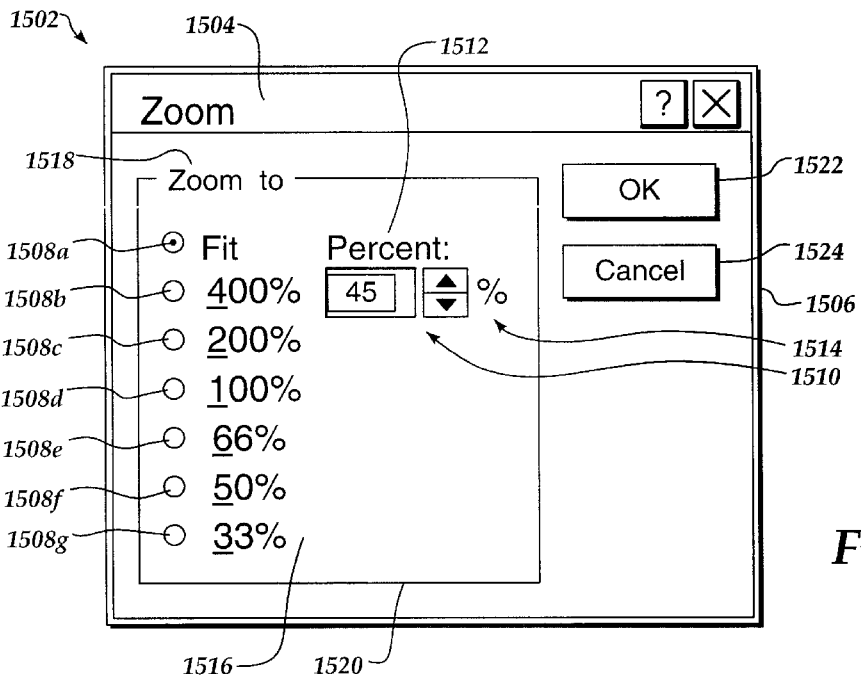
FIG. 15A is an exemplary pictorial representation of a dialog window created in accordance with the invention.

FIG. 15A illustrates an exemplary dialog window 1502 produced in accordance with the invention. The dialog window 1502 comprises a title bar 1504 and a display area 1506 that contains all of the controls.

The display area 1506 includes a set of radio button controls 1508a–g. Each radio button control 1508a–g includes a corresponding text label. Radio buttons are programmed so that only one of a set of radio buttons can be selected at any time. The display area 1506 further includes a number input control 1510 that has an associated top string 1512 and a right string 1514. A label box control 1516 comprising a text label 1518 and a border 1520 encompasses the radio buttons 1508a–g and the number input control 1510. An "OK" button 1522 and a "CANCEL" button 1524 are positioned to the right of the label box control 1516.

Figure 15B:
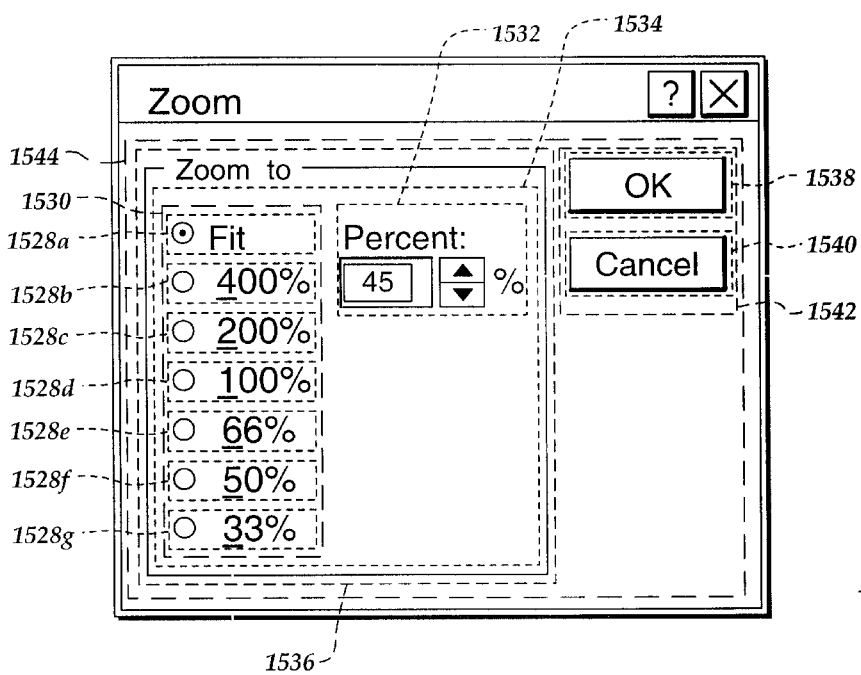
FIG. 15B is a pictorial illustration of the dialog window depicted in FIG. 15A, illustrating the frames that are created in the dialog window.
Figure 16:
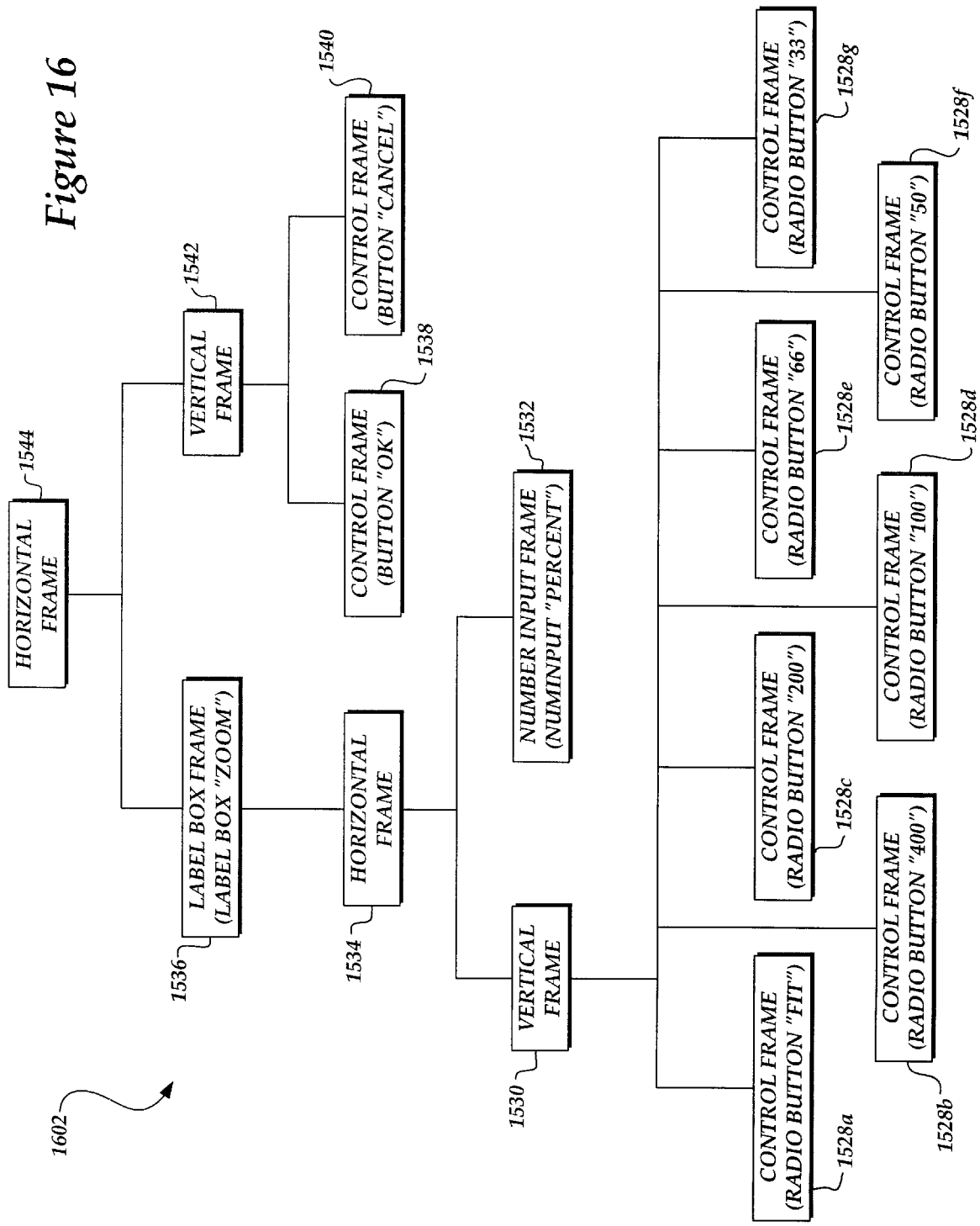
FIG. 16 illustrates a hierarchy of frames utilized in the creation of the dialog window shown in FIG. 15A, in accordance with the invention.

FIG. 15B illustrates the frames that are created and used to lay out the controls of the dialog window 1502 in the employment of the present invention. FIG. 16 illustrates a frame tree 1602 corresponding to the frames shown in FIG. 15B. In FIG. 16, each frame that has an associated control shows the type of control and the text of the control within parentheses. Each of the radio button controls 1508a–g has a corresponding Control Frame 1528a–g. A Vertical Frame 1530 is the parent frame of the Control Frames 1528a–g and encloses all of these frames. The number input control 1510 has an associated Number Input Frame 1532. The Number Input Frame also encloses the top string 1512 and the right string 1514. A Horizontal Frame 1534 is the parent frame of the Vertical 1530 and the Number and the Number Input Frame 1532, and encloses both of these frames. A Label Box Frame 1536 is the parent frame of the Horizontal Frame 1534, and has as its associated control the label box control 1516. A Control Frame 1538 has the "OK" button 1522 as its associated control. A Control Frame 1540 has the "Cancel" button 1524 as its associated control. A Vertical Frame 1542 is the parent frame of, and encloses the Control Frames 1538 and 1540. A Horizontal Frame 1544 is the parent frame of the Label Box Frame 1536 and the Vertical Frame 1542. The Horizontal Frame 1544 is the root frame of the frame tree.

FIG. 17 illustrates a segment of program code that comprises the autolayout specification module 310 (FIG. 3) in accordance with the present invention. Referring back to the process 402 shown in FIG. 4 that comprises the autolayout specification, the parts of the program code illustrated in FIG. 17 corresponding to each step of the autolayout specification 402 are now described.

Part 1 of the program code in FIG. 17 performs step 404 of defining and creating the frames in the frame tree for the dialog window. Part 2 of the program code in FIG. 17 performs the step 406 of building the hierarchy of frames that comprise the frame tree. Part 3 of the program code performs step 408 of specifying nondefault frame attributes.

Part 4 of the program code performs step 410 of invoking the Autolayout engine.

The dialog window 1502 is similar to the exemplary dialog window 102 illustrated in FIGS. 1A–D, and therefore a detailed discussion of the layout process as applied to the dialog window 1502 is not necessary, except for the following selected aspects. The frame tree 1602 that is created for the dialog window 1502 includes a Label Box Frame 1536 having an associated label box control 1516 and a Horizontal Frame 1534 as a child frame. At step 606 of setting the minimum frame size (FIG. 6) during the calculation of constraints when the Label Box Frame 1536 is the current frame, the autolayout engine sets the minimum height to equal the total heights of the child frame (the Horizontal Frame 1534), the top margin, and the bottom margin. Since the margins are not explicitly set in the layout specification, default margin values are used. Similarly, the autolayout engine sets the width of the Label Box Frame 1536 to equal the total widths of its child frame (the horizontal Frame 1534), the left margin, and the right margin.

The Vertical Frame 1542 has two child Control Frames 1538 and 1540, each of which has an associated push-button control, the "OK" button control 1522 and the "Cancel" button control 1524, respectively. As stated above in the discussion of Vertical Frames, if all child frames of a Vertical Frame are Control Frames having an associated push-button control, the SameWidthChildren() method is automatically invoked on the Vertical Frame. As a result, at the step 604 (FIG. 6) of enlarging child frames that must grow when the Vertical Frame 1542 is the current frame during the calculation of constraints, the autolayout engine enlarges the child ("OK") Control Frame 1538 to match its sibling ("Cancel") Control Frame 1540.

When the Horizontal Frame 1534 is the current frame, at the step 714 (FIG. 7) of stretching the child frame's packing areas, the autolayout engine stretches the packing area of the Number Input Frame 1532 in the vertical direction. At the step 716 of repositioning the child frames' packing and display areas, the autolayout engine positions the Number Input Frame 1532 toward the top left (northwest) corner of the Horizontal Frame 1534. Similarly, when the Vertical Frame 1542 is the current frame at step 716, the child Control Frames 1538 and 1540 are, by default, positioned toward the top left (northwest) corner of the Vertical Frame 1542. Since no frames depicted in FIG. 15B have explicit specifications to expand, no display areas expand during the preorder traversal of the frame tree.

As stated above, the frames depicted in FIG. 1B are not displayed in the actual dialog window. In one actual embodiment, the mechanism of the invention includes an option to display the frames for purposes of debugging the autolayout specification module. Since the borders of a parent frame may overlap with one or more borders of its child frames or controls, the mechanism of the invention displays the frames in a plurality of different colors. The different colors aid in distinguishing the frames. In one actual embodiment, the color of a frame depends on the frame's depth in the frame tree. For example, as depicted in FIG. 1B, the (root) Horizontal Frame 1544 is colored red, and its children, the Label Box Frame 1536 and the Vertical Frame 1542 are purple. The next level of child frames, the Control Frames 1522 and 1524 and the Horizontal Frame 1534 are blue. The next level of child frames, the Vertical Frame 1530 and the Number Input Frame 1532, are green. The next level of child frames, the Control Frames 1528a–g, are yellow. After exhausting a predetermined sequence of colors, the sequence is repeated, beginning with the root frame's color.

Figure 18A:
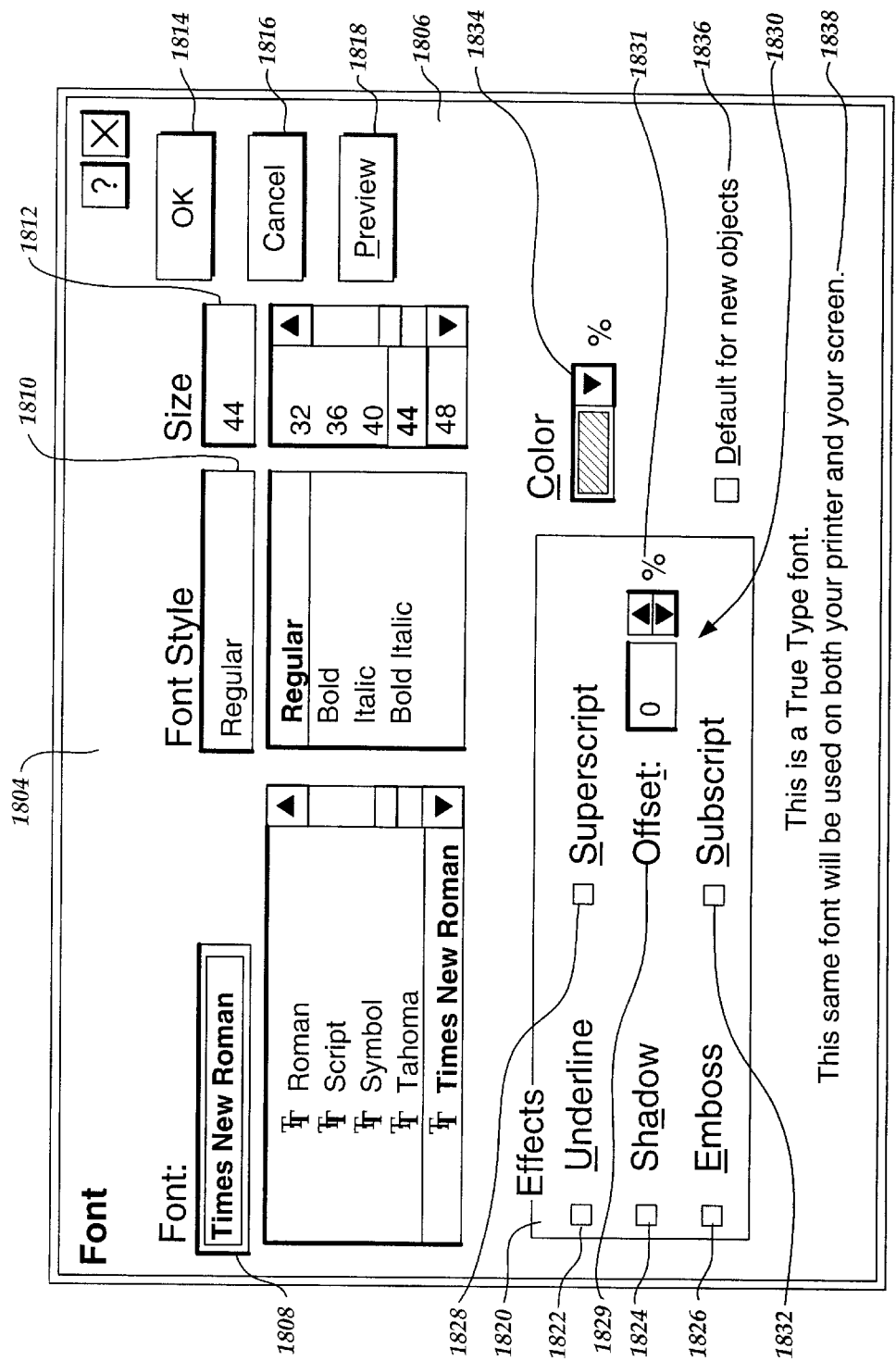
FIG. 18A is an exemplary pictorial representation of a dialog window created in accordance with the invention.
Figure 18B:
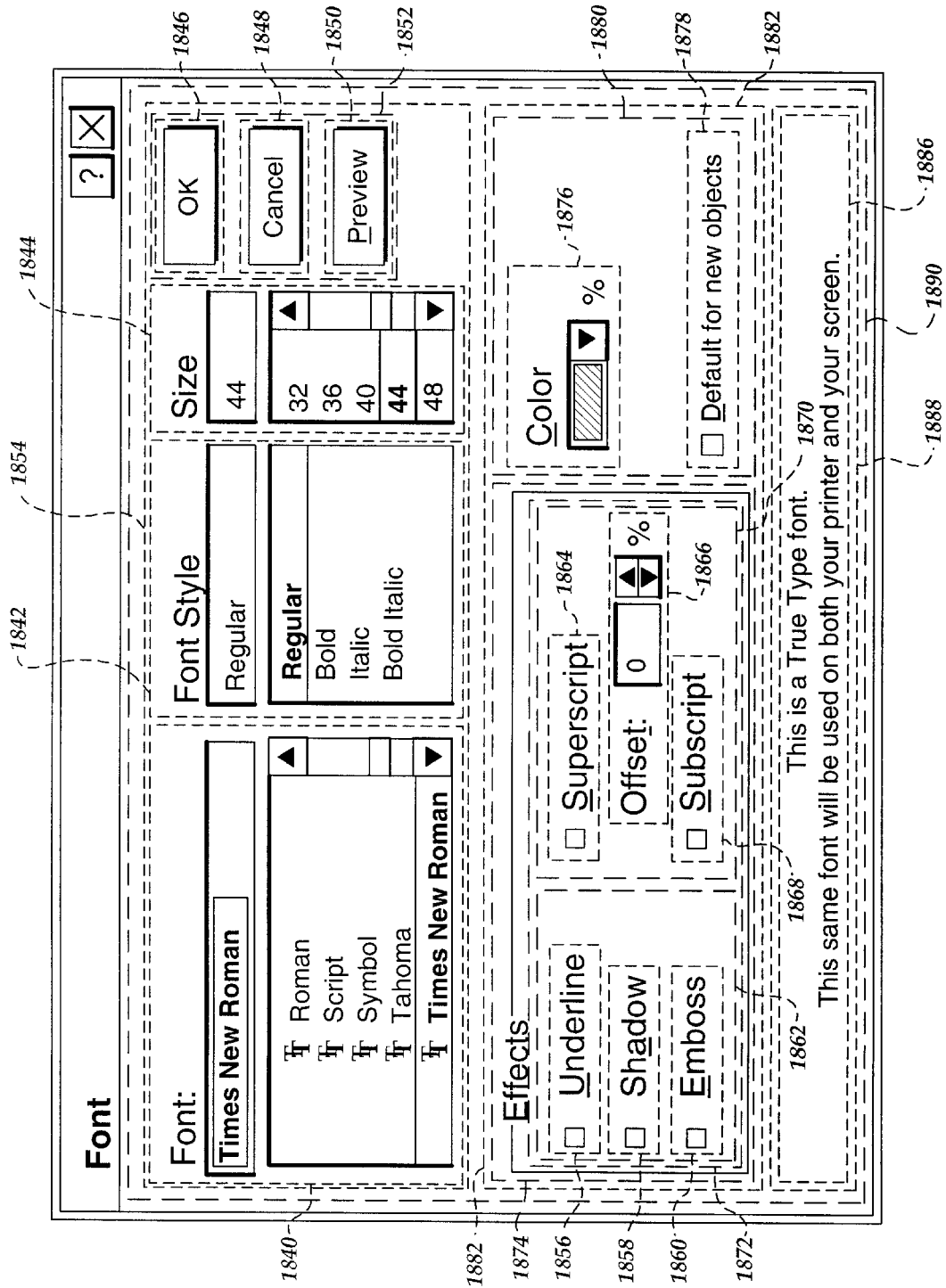
FIG. 18B is a pictorial illustration of the dialog window depicted in FIG. 18A, illustrating the frames that are created in the dialog window.

FIG. 18A illustrates an exemplary dialog window 1802 produced in accordance with the invention. The dialog window 1802 comprises a title bar 1804 and a display area 1806 that contains all of the controls.

The top of the display area 1806 includes three horizontally spaced apart combo box controls: a font combo box 1808, a fontStyle combo box 1810, and a fontSize combo box 1812. Each of the combo box controls depicted in the dialog window 1802 comprises three controls: a text label control, an edit box control, and a list box control.

To the right of the fontSize combo box 1812, the dialog window display area 1806 includes three vertically spaced apart push-button controls: an "OK" push-button control 1814, a "Cancel" push-button control 1816, and a "Preview" push-button control 1818. As depicted, the three push-button controls are horizontally aligned and equal in width.

Below the set of combo boxes, the dialog window display area 1806 further includes an "Effects" label box control 1820. The "Effects" label box control encloses three left-aligned check box controls: an "Underline" check box control 1822, a "Shadow" check box control 1824, and an "Emboss" check box control 1826. The "Effects" label box control 1820 also includes, to the right of the above-described check boxes, a "Superscript" check box control 1828, a number input control 1830 having an associated "Offset" string control 1829 and a "%" string control 1831, and a "Subscript" check box control 1832. The dialog window display area 1806 further includes, to the right of the "Effects" label box control 1820, a "Color" popup control 1834, and a "Default" check box control 1836, vertically spaced apart from each other.

The dialog window display area 1806 further includes, along the bottom of the display area, two static text controls superimposed on each other. A "TrueType" text control 1838 is visible in FIG. 18A. A second static text control is not visible in FIG. 18A. The dialog window 1802 is programmed so that only one of the static text controls is visible at any time.

Figure 19A:
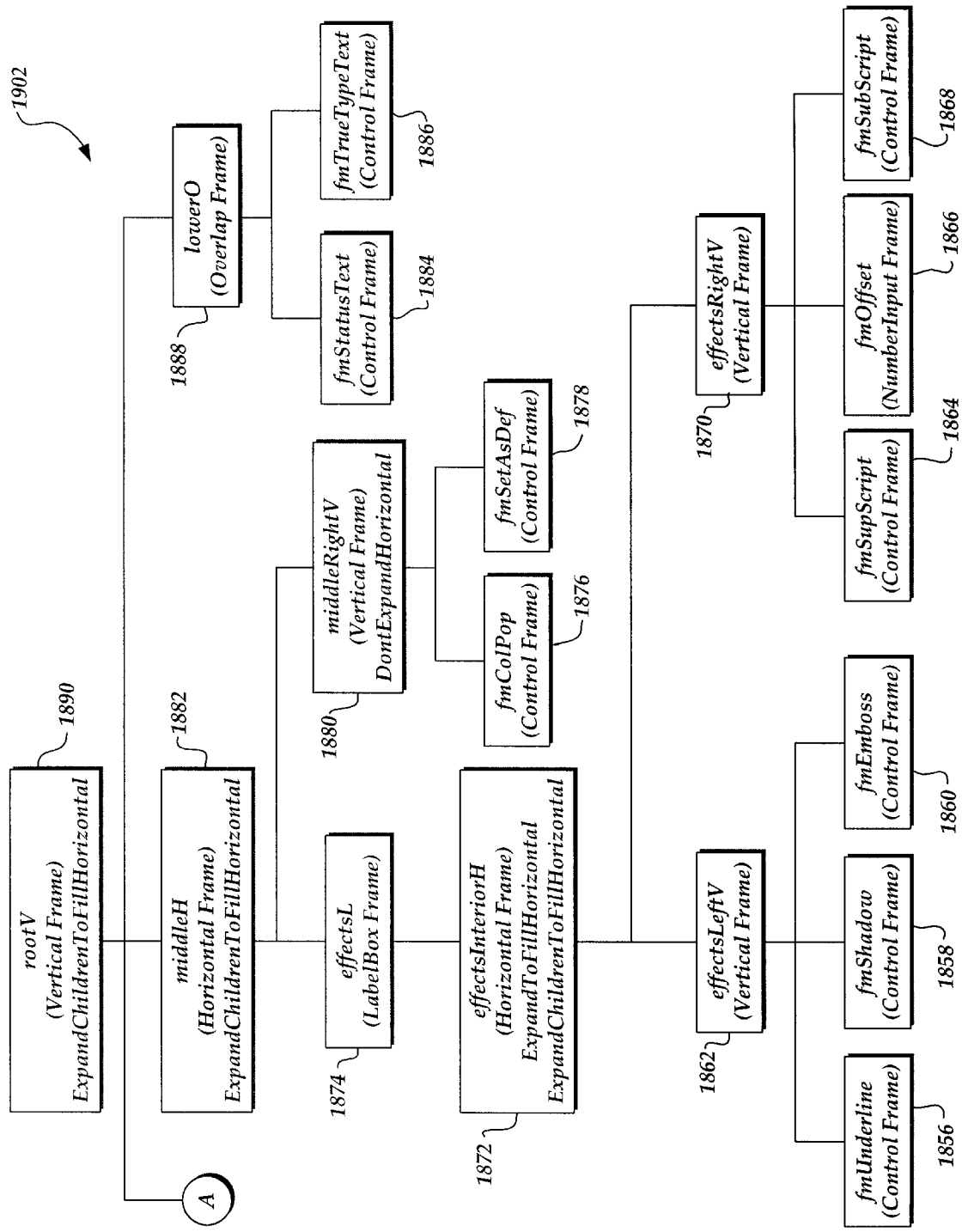
FIGS. 19A–B illustrate the hierarchy of frames created in the dialog window shown in FIG. 18A, in accordance with the invention.
Figure 19B:
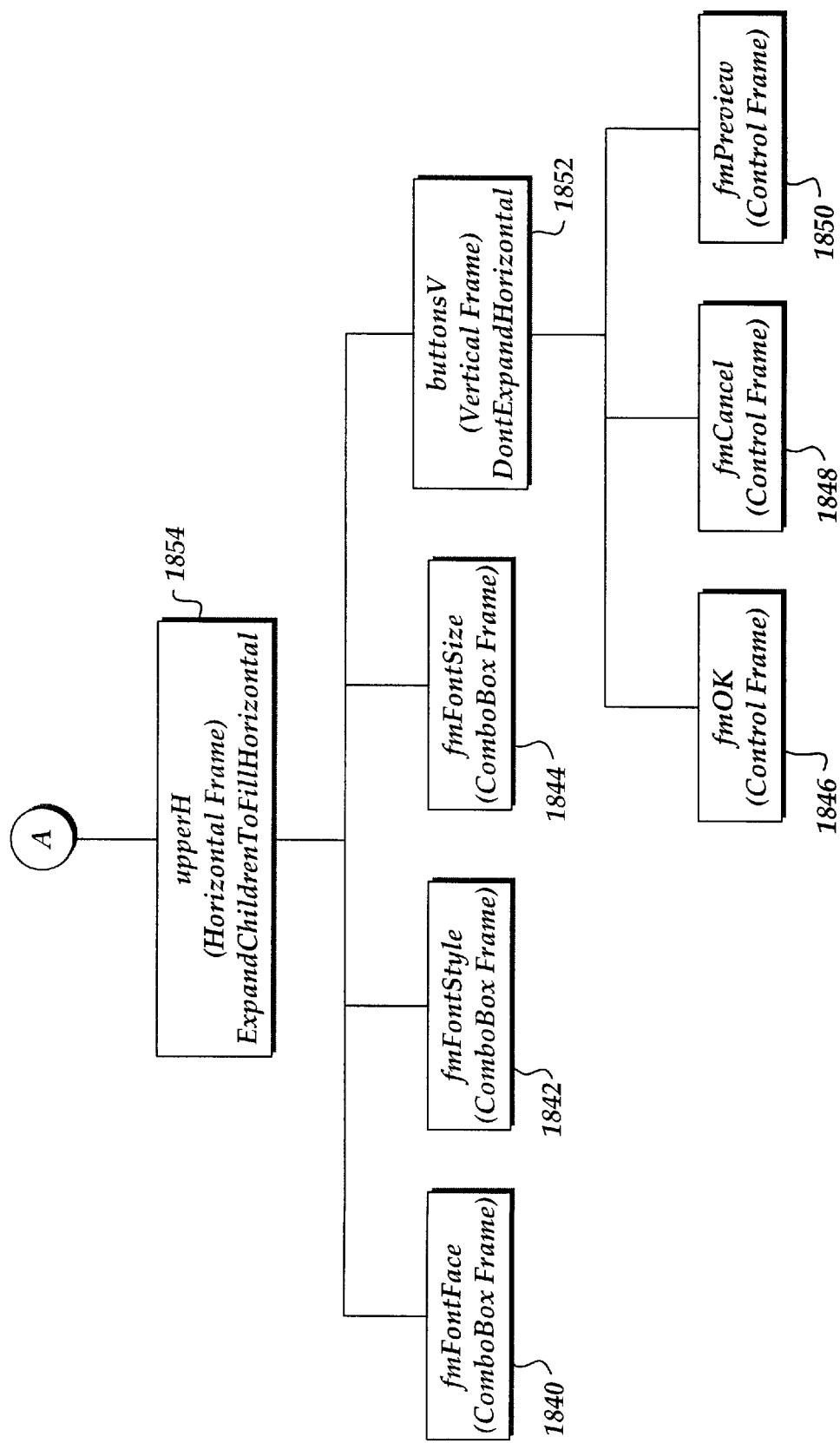

FIG. 18B illustrates the frames that are created and used to lay out the controls of the dialog window 1802 in the employment of the present invention. FIGS. 19A–B illustrate a frame tree 1902 corresponding to the frames shown in FIG. 18B. In FIGS. 19A–B, each block representing a frame includes the name of the frame on the first line and the frame type within parentheses on the second line. The names of methods related to horizontal expansion that are invoked to produce the dialog window 1802 are listed on the remaining lines.

The frame tree 1902 includes three ComboBox Frames: an fmFontFace frame 1840, an fmFontStyle frame 1842, and an fmfontSize frame 1844. Each of these ComboBox Frames has an associated combo box control: the font combo box 1808, the fontStyle combo box 1810, and the fontSize combo box 1812, respectively.

The frame tree 1902 also includes three Control frames: an fmOK frame 1846, an fmCancel frame 1848, and an fmPreview frame 1850. Each of these Control Frames has an associated push-button control: the "OK" push-button control 1814, the "Cancel" push-button control 1816, and the "Preview" push-button control 1818, respectively. A Vertical frame, buttonsV 1852, encloses, and is the parent frame of the fmOK frame 1846, the fmCancel frame 1848, and the fmPreview frame 1850. A Horizontal frame, upperH 1854, encloses, and is the parent frame of the fmFontFace frame, the fmFontStyle frame 1842, the fmFontSize frame 1844, and the buttonsV frame 1852.

The frame tree further includes three Control frames: an fmUnderline frame 1856, an fmShadow frame 1858, and an fmEmboss frame 1860. Each of these Control frames has an associated check box control: the "Underline" check box control 1822, the "Shadow" check box control 1824, and the "Emboss" check box control 1826, respectively. A Vertical frame, effectsLeftV 1862 encloses, and is the parent frame of the fmUnderline frame 1856, the fmShadow frame 1858, and the fmEmboss frame 1860.

The frame tree further includes two additional Control frames: an fmSuperscript frame 1864 and an fmSubscript frame 1868. Each of these Control frames has an associated control: the "Superscript" check box control 1828 and the "Subscript" check box control 1832, respectively. A Number Input frame, the fmOffset frame 1866, has three associated controls: the number input control 1830, the "Offset" text string 1829, and the "%" text string 1831.

A Vertical frame, effectsRightV 1870 encloses, and is the parent frame of the fmSuperscript frame 1864, the fmOffset frame 1866, and the fmSubscript frame 1868. A Horizontal frame, effectsInteriorH 1872, encloses, and is the parent frame of, the effectsLeftV frame 1862 and the effectsRightV frame 1870. A Label Box frame, effectsL 1874, encloses, and is the parent frame of the effectsInteriorH frame 1872.

Two Control frames, fmColPop 1876 and fmSetAsDef 1878, have associated controls: the "Color" control 1834 and the "Default" check box control 1836, respectively. A Vertical frame, middleRightV 1880 encloses, and is the parent frame of the fmColPop frame 1876 and the fmSetAs-Def frame 1878. A Horizontal frame, middleH 1882, encloses, and is the parent frame of the effectsL frame 1874 and the middleRightV frame 1880.

Two Control frames, fmStatusText 1884 (FIG. 19A) and fmTrueTypeText 1886, have associated static text controls: the "TrueType" static text control 1838, and the "Status" static text control (not shown). An Overlap frame, lowerO 1888 encloses the fmStatusText frame 1884 and the fmTrueTypeText frame 1886.

A Vertical frame, rootV 1890, encloses, and is the parent frame of the upperH frame 1854, the middleH frame 1882, and the lowerO frame 1888. The rootV frame 1890 is the root frame of the frame tree 1902.

Referring now to FIGS. 7, 18B, and 19, selected steps in the preorder traversal of the tree illustrated in FIG. 7 are now discussed to illustrate the determination of frame positions and sizes in the horizontal dimension. The following discussion is divided in order to clearly differentiate the visits to each node of the frame tree.

Current Frame: rootV

When the rootV frame 1890 is the current frame, at step 714, the autolayout engine expands the packing area corresponding to each of the rootV frame's child frames (upperh 1854, middleH 1882, and lowerO 1888). The packing areas are expanded to the horizontal boundaries of the rootV frame.

Since the ExpandChildrenToFillHorizontal attribute is set, at step 716, the autolayout engine expands each of the child frame's display areas to the limits of their respective packing areas. This makes the display areas of the upperH, middleH, and lowerO frames equal in width to the rootV frame 1890.

Current Frame: upperH

In the next level of recursion, the autolayout engine first visits the upperH frame 1854. Since the ExpandChildrenTo-FillHorizontal attribute is set, at step 716, the autolayout engine expands the display areas and packing areas of each child frame of upperH except for the buttonsV frame 1852. The buttonsV frame is not expanded because its DontExpandHorizontal attribute is set. Therefore, only the remaining child frames (fmFontFace 1840, fmFontStyle 1842, and fmFontSize 1844) expand horizontally. Since the invocation of ExpandChildrenToFillHorizontal() includes an argument of "PROPORTIONAL," the layout engine expands the child frames proportionally to their sizes as they existed prior to step 716.

Current Frame: middleH

The operations performed on the middleH frame 1882 are similar to those described above for the upperh frame 1854. Since the ExpandChildrenToFillHorizontal attribute is set, the child frames of middleH are expanded horizontally at step 716. However, since the DontExpandToFillHorizontal attribute is set on the child frame, middleRightV 1880, the middleRightV frame is not expanded. Therefore, only the effectsL frame 1874 expands horizontally.

Current Frame: effectsL

When the effectsL frame 1874 is the current frame, at step 714, the autolayout engine expands the packing area of its child frame, the effectsInteriorH frame 1872. This is performed because the default behavior of a Label Box frame at step 714 is to expand the packing area of its child frame, both horizontally and vertically. The child frame's packing area is expanded to the inner border of the EffectsL frame's margins in all directions.

Current Frame: effectsInteriorH

When the effectsInteriorH frame 1872 is the current frame, at step 706, the ExpandToFillHorizontal attribute causes the display area of the effectsInteriorH frame to expand horizontally to the limits of its packing area. The packing area was previously expanded when the effectsL frame 1874 was the current frame, as described above.

At step 716, the ExpandChildrenToFillHorizontal attribute causes the autolayout engine to expand the child frames of the effectsInteriorH frame: the effectsLeftV frame 1862 and the effectsRightV frame 1870.

Current Frame: effectsRightV

When the effectsRightV frame 1870 is the current frame, at step 714, the autolayout engine horizontally expands the packing areas of the child frames: fmSuperscript 1864, fmOffset 1866, and fmSubscript 1868. As discussed above, this is automatically performed at step 714 when the current frame is a Vertical Frame.

Current Frame: FmOffset

At step 408 (FIG. 4), the autolayout specification module invokes the AddLeftString, AddRightString, and SetWidth-Digits methods on the fmOffset frame 1866. The SetWidth-Digits method expands the display area of the fmOffset frame in the layout specification stage. The AddLeftString and AddRightString methods expand the fmOffset frame in the calculation of constraints. Additionally, an invocation of the Indent() method on the fmOffset frame 1866 expands its display area by one level of indentation, at step 608 in the calculation of constraints. When fmOffset is the current frame, at step 708, the autolayout engine repositions its display area horizontally to the right by one level of indentation. Also, the display area width is reduced by the same amount. At step 712, the autolayout engine sets the coordinates of the number input control 1830, the "Offset" text string 1829, and the "%" text string 1831 corresponding to the fmOffset frame 1866. FIG. 18A illustrates the effects of the above-described adjustments. The number input control 1830 and its associated text strings are indented by the width of a check box.

The above discussion describes selected steps in the determination of frame positions and sizes in the horizontal dimension during the performance of the invention on the dialog window 1802. The autolayout engine performs similar determinations and adjustments in the vertical direction, and need not be described herein.

Figure 20A:
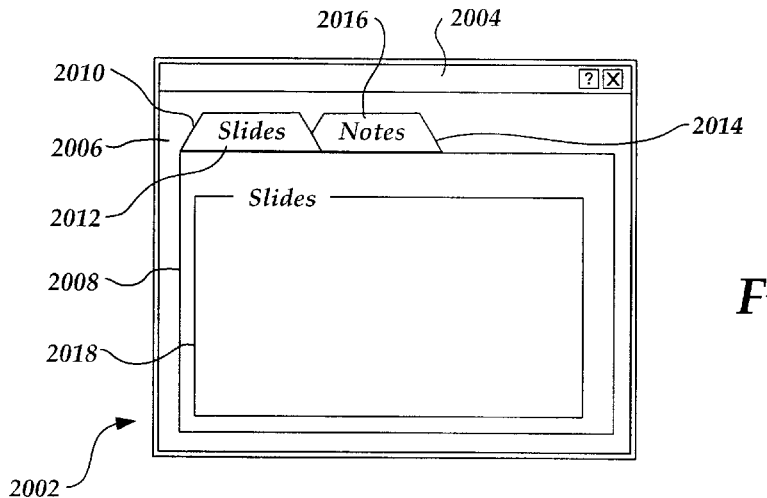
FIG. 20A–B are exemplary pictorial representations of a dialog window created in accordance with the invention.
Figure 20B:
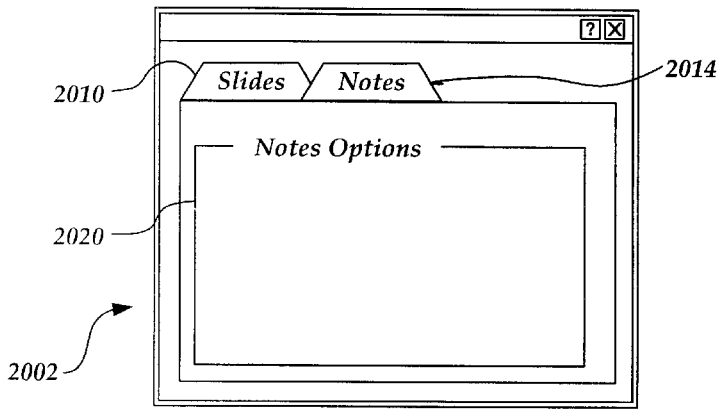

FIG. 20A illustrates an exemplary dialog window 2002 produced in accordance with the invention. The dialog window 2002 comprises a title bar 2004 and a display area 2006. The display area 2006 includes a tab control 2008. The tab control includes a "Slides" tab 2010 having text 2012 contained therein. The tab control also includes a "Notes" tab 2014 having associated text 2016 displayed therein. Each tab has an associated set of controls that are displayed when the tab is "on top." When a tab is "behind," its associated controls are not visible. In FIG. 20A, the "Slides" tab 2010 is on top, and the "Notes" tab 2014 is behind. A label box control 2018, associated with the "Slides" tab 2010 is visible in FIG. 20A. FIG. 20B shows the dialog window 2002 when the "Notes" tab 2014 is on top, and the "Slides" tab 2010 is behind. In FIG. 20B, a label box control 2020 having the text "Notes Options" is visible, and the label box control 2018 associated with the "Slides" tab 2010 is hidden. Additional controls associated with each of the tabs 2010 and 2014 are not shown in FIGS. 20A and 20B.

Figure 20C:
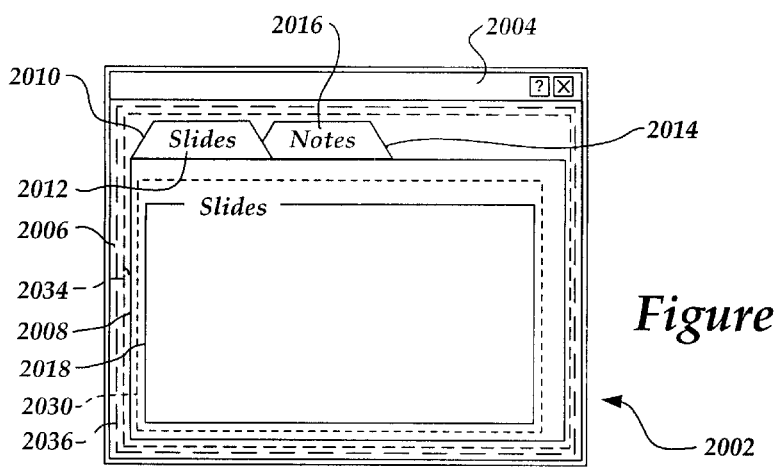
FIG. 20C is a pictorial illustration of the dialog window depicted in FIGS. 20A–B, illustrating the frames that are created in the dialog window.
Figure 21:
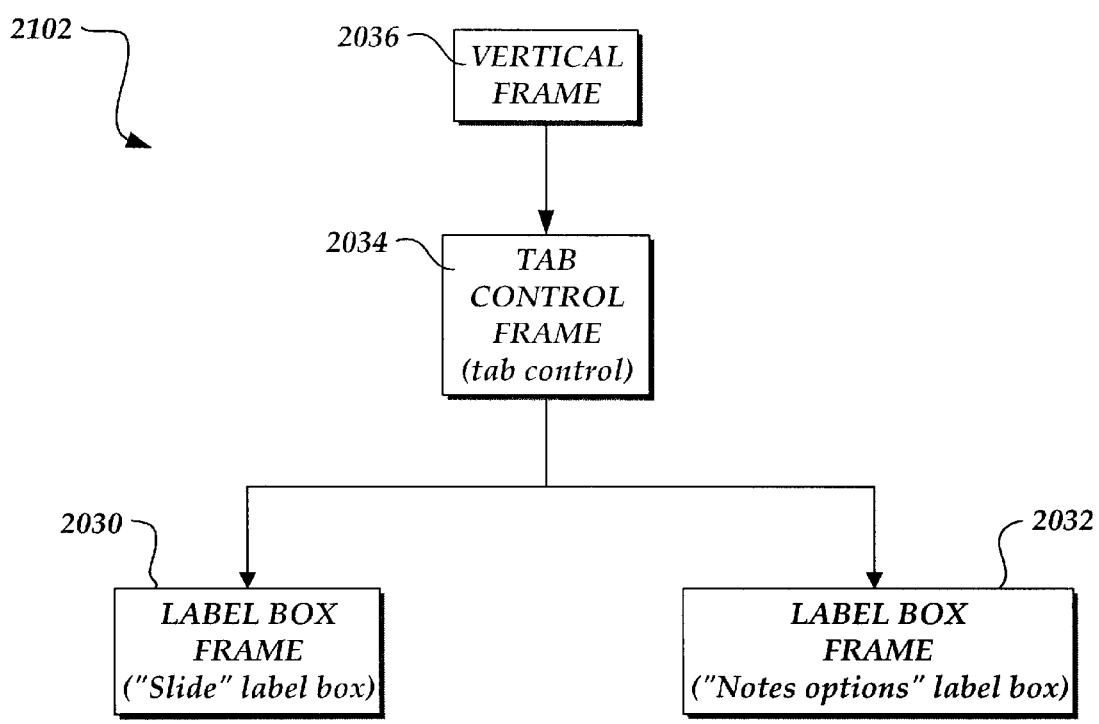
FIG. 21 illustrates a hierarchy of frames utilized in the creation of the dialog window shown in FIGS. 20A–B, in accordance with the invention.

FIG. 20C illustrates the frames that are created and used to lay out the controls of the dialog window 2002 in the employment of the present invention. FIG. 21 illustrates a frame tree 2102 corresponding to the frames shown in FIG. 20C. In FIG. 21, each frame having an associated control identifies the control within parenthesis on the second line. The label box control 2018 has a corresponding Label Box Frame 2030. A second Label Box Frame 2032 is associated with the "Notes Options" label box 2020.

A Tab Control Frame 2034 is the parent frame of the Label Box Frames 2030 and 2032. The tab control 2008 is the corresponding control of the Tab Control Frame 2034. A Vertical Frame 2036 encloses, and is the parent of the Tab Control Frame 2034.

At step 606 during the calculation of constraints, the autolayout engine determines the width of the Tab Control Frame 2034 to be equal to the greater width of its two child frames, the Label Box Frames 2030 and 2032, plus the left and right margins of the Tab Control Frame frame. Similarly, the autolayout engine determines the height of the Tab Control Frame 2034 to enclose the taller of its two child frames plus a top and bottom margin. In addition, the height of the Tab Control Frame also includes an amount necessary to enclose the tabs 2010 and 2014, as displayed in FIG. 20A. The tab control may include more than one row of tabs. The autolayout engine accounts for any extra height resulting from additional rows of tabs.

In one actual embodiment, the autolayout engine utilizes the Windows 95 operating system to determine the height of a Tab Control Frame. After determining the width of the Tab Control Frame, the autolayout engine calls the operating system to resize the corresponding tab control, passing an arbitrary height dimension. The operating system lays out the tab control, including the rows of tabs. The autolayout engine then queries the operating system for the number of tab rows. Since tab rows are a fixed height in the Windows 95 operating system, the autolayout engine determines the total height of the tabs based on the number of tab rows.

In addition to displaying frames in multiple colors to assist the debugging of the autolayout specification, a string length mechanism provides debugging assistance. The string length mechanism automatically alters the contents of strings displayed in a dialog window, to simulate the results of varying dialog window alterations. By observing the resultant dialog window layouts, a programmer can validate the sufficiency of a particular autolayout specification.

The mechanism of the invention also provides a way to deactivate the autolayout mechanism for a dialog window. In one actual embodiment, setting a flag in the resource data corresponding to a dialog window prevents autolayout of the dialog window.

In order to accommodate languages that are read from right to left, the invention provides a mechanism for reversing dialogs. When this mechanism is triggered, after the autolayout engine determines a size and position for each frame, all of the coordinates within the dialog window are reversed to create a mirror image of the original window. This mechanism adds additional assistance to the internationalization of dialog windows.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for specifying and laying out the display of a dialog window containing a plurality of controls in a computer system comprising a processor and a display screen, said method comprising:

specifying a plurality of frames, each frame representing a region within the dialog window, the frames forming a hierarchical tree of frames, the tree of frames including at least one parent frame having at least one associated child frame, wherein a region represented by each parent frame encloses a region represented by its associated child frame, each control having an associated frame;

determining a minimum size of each child frame;

determining a minimum size of each parent frame based on the minimum sizes of its child frames;

determining a position of each parent frame;

determining a position of each child frame based on the position of its parent frame;

determining a size and position of each control, based on the determined size and position of its associated frame; and displaying each control according to its determined size and position.

2. The method of claim 1, wherein the frame tree includes a first frame and a second frame, further comprising:

specifying at least one positional relationship between the first frame and the second frame; and determining a position of the first frame based on the positional relationship between the first frame and the second frame.

3. The method of claim 2, wherein the first frame is a parent frame and the second frame is a parent frame.

4. The method of claim 3, further comprising:

specifying at least one size relationship between the first frame and the second frame; and determining at least one dimension of the first frame based on the size relationship between the first frame and the second frame.

5. The method of claim 2, wherein the first frame is a child frame of the second frame.

6. The method of claim 1, wherein the frame tree includes at least one grandparent frame that is a parent frame of at least one parent frame.

7. The method of claim 6, further comprising determining a size of the window based on the minimum size of the grandparent frame.

8. The method of claim 1, further comprising selectively determining a second size of each child frame based on the determined size of its parent frame, wherein the second size of each frame is greater in at least one dimension than its minimum size.

9. The method of claim 8, wherein the frame tree includes a first frame and a second frame, further comprising:
    specifying at least one positional relationship between the first frame and the second frame; and
    determining a position of the first frame based on the positional relationship between the first frame and the second frame.

10. The method of claim 9, wherein the first frame is a parent frame and the second frame is a parent frame.

11. The method of claim 10, further comprising:
    specifying at least one size relationship between the first frame and the second frame; and
    determining at least one dimension of the first frame based on the size relationship between the first frame and the second frame.

12. The method of claim 8, wherein the frame tree includes a first frame and a second frame, further comprising:
    specifying at least one size relationship between the first frame and the second frame; and
    determining the second size of the first frame based on the size of the second frame.

13. The method of claim 12, wherein the first frame and the second frame are parent frames, and wherein the second size of a child frame of the first frame is based on the minimum size of a child frame of the second frame.

14. The method of claim 8, wherein the frame tree includes a first frame, a second frame, and a third frame, wherein the third frame is a parent frame of the first frame and second frame, further comprising:
    determining a width of the third frame based on a total of a width of the first frame and a width of the second frame;
    determining a second width of the first frame based on the width of the third frame, wherein the second width of the first frame is greater than the first width of the first frame.

15. The method of claim 14, further comprising:
    specifying that the width component of the second frame's minimum size is not to be expanded.

16. The method of claim 14, wherein the frame tree includes a fourth frame that is not a child frame of the third frame, further comprising:
    determining a second width of the third frame based on a width of the fourth frame.

17. The method of claim 16, wherein the fourth frame is a sibling frame of the third frame.

18. The method of claim 1, further comprising:
    performing a first traversal of the frame tree, wherein the step of determining a minimum size of each parent frame occurs during the first traversal of the frame tree;
    performing a second traversal of the frame tree, wherein the step of determining a position of each child frame occurs during the second traversal of the frame tree.

19. The method of claim 18, wherein the step of determining a second size of each child frame occurs during the second traversal of the frame tree.

20. The method of claim 19, wherein the frame tree includes a root node, a plurality of leaf nodes, and a plurality of intermediate nodes, and the first traversal of the frame tree occurs from the leaf nodes of the frame tree to the root node of the frame tree.

21. The method of claim 20, wherein the first traversal of the frame tree is performed in postorder sequence.

22. The method of claim 21, wherein the second traversal of the frame tree is performed from the root node of the frame tree to the leaf nodes of the frame tree.

23. The method of claim 22, wherein the second traversal of the frame tree is performed in preorder sequence.

24. The method of claim 1, wherein the frame tree includes a first frame, a second frame, and a third frame, wherein the third frame is a parent frame of the first frame and second frame, further comprising:
    determining a width of the third frame based on the greater width between the first frame and the second frame; and
    determining a height of the third frame based on the greater height between the first frame and the second frame.

25. The method of claim 24, further comprising:
    determining a second width of the first frame based on the width of the third frame, wherein the second width of the first frame is greater than its minimum size.

26. The method of claim 1, further comprising:
    selectively displaying the border of each frame in a corresponding color, wherein a color corresponding to each frame is different from a color corresponding to its child frames.

27. The method of claim 1, further including:
    creating the window; and
    wherein the step of creating the window is performed prior to determining a size and position of each control.

28. The method of claim 1, further comprising:
    displaying the window a plurality of times;
    wherein the step of determining the minimum size of each child frame is performed a plurality of times, each said step being performed subsequent to a previous step of displaying the window, and wherein the minimum size of at least one child frame is determined to be different from a previous determination of the minimum size of the child frame.

29. A program storage device readable by a machine, tangibly embodying a program of instructions executable by the machine to perform method steps for specifying and laying out the display of a dialog window containing a plurality of controls, the method steps comprising:
    specifying a plurality of frames, each frame representing a region within the dialog window, the frames forming a hierarchical tree of frames, the tree of frames including at least one parent frame having at least one associated child frame, wherein a region represented by each parent frame encloses a region represented by its associated child frame, each control having an associated frame;
    determining a minimum size of each child frame;
    determining a minimum size of each parent frame based on the minimum sizes of its child frames;
    determining a position of each parent frame;
    determining a position of each child frame based on the position of its parent frame;
    determining a size and position of each control, based on the determined size and position of its associated frame; and
    displaying each control according to its determined size and position.

30. The program storage device of claim 29, wherein the tree of frames includes a first frame and a second frame, and wherein the method steps further comprise:
specifying at least one positional relationship between the first frame and the second frame; and
determining a position of the first frame based on the positional relationship between the first frame and the second frame.

31. The program storage device of claim 30, wherein the first frame is a parent frame and the second frame is a parent frame.

32. The program storage device of claim 31, wherein the method steps further comprise:
specifying at least one size relationship between the first frame and the second frame; and
determining at least one dimension of the first frame based on the size relationship between the first frame and the second frame.

33. The program storage device of claim 30, wherein the first frame is a child frame of the second frame.

34. The program storage device of claim 29, wherein the frame tree includes at least one grandparent frame that is a parent frame of at least one parent frame.

35. The program storage device of claim 34, wherein the frame tree includes exactly one root frame that is an ancestor to all other frames in the frame tree, the method steps further comprising determining a size of the window based on the minimum size of the root frame.

36. The program storage device of claim 29, wherein the method steps further comprise selectively displaying the border of each frame in a corresponding color, wherein a color corresponding to each frame is different from a color corresponding to its child frames.

37. The program storage device of claim 29, wherein the method steps further comprise:
creating the window; and
wherein the step of creating the window is performed prior to determining a size and position of each control.

38. The program storage device of claim 29, wherein the method steps further comprise selectively determining a second size of each child frame based on the determined size of its parent frame, and wherein the second size of each frame is greater in at least one dimension than its minimum size.

39. The program storage device of claim 38, wherein the tree of frames includes a first frame and a second frame, and wherein the method steps further comprise:
specifying at least one positional relationship between the first frame and the second frame; and
determining a position of the first frame based on the positional relationship between the first frame and the second frame.

40. The program storage device of claim 39, wherein the first frame is a parent frame and the second frame is a parent frame.

41. The program storage device of claim 40, wherein the method steps further comprise:
specifying at least one size relationship between the first frame and the second frame; and
determining at least one dimension of the first frame based on the size relationship between the first frame and the second frame.

42. The program storage device of claim 39, wherein the first frame is a child frame to the second frame.

43. The program storage device of claim 38, wherein the frame tree includes at least one grandparent frame that is a parent frame of at least one parent frame.

44. The program storage device of claim 38, wherein the frame tree includes a first frame and a second frame, the method steps further comprising:
specifying at least one size relationship between the first frame and the second frame; and
determining the second size of the first frame based on the size of the second frame.

45. The program storage device of claim 44, wherein the first frame and the second frame are parent frames, and wherein the second size of a child frame of the first frame is based on the minimum size of a child frame of the second frame.

46. The program storage device of claim 38, wherein the frame tree includes a first frame, a second frame, and a third frame, wherein the third frame is a parent frame of the first frame and second frame, the method steps further comprising:
determining a width of the third frame based on a total of a width of the first frame and a width of the second frame;
determining a second width of the first frame based on the width of the third frame, wherein the second width of the first frame is greater than the first width of the first frame.

47. The program storage device of claim 46, wherein the method steps further comprise specifying, prior to determining the minimum size of the second frame that the width component of the second frame's minimum size is not to be expanded.

48. The program storage device of claim 38, wherein the method steps further comprise:
performing a first traversal of the frame tree, wherein the step of determining a minimum size of each parent frame occurs during the first traversal of the frame tree;
performing a second traversal of the frame tree, wherein the step of determining a position of each child frame occurs during the second traversal of the frame tree.

49. The program storage device of claim 48, wherein the step of determining a second size of each child frame occurs during the second traversal of the frame tree.

50. The program storage device of claim 49, wherein the frame tree includes a root node, a plurality of leaf nodes, and a plurality of intermediate nodes, and the first traversal of the frame tree occurs from the leaf nodes of the frame tree to the root node of the frame tree.

51. The program storage device of claim 50, wherein the first traversal of the frame tree is performed in postorder sequence.

52. The program storage device of claim 50, wherein the second traversal of the frame tree is performed from the root node of the frame tree to the leaf nodes of the frame tree.

53. The program storage device of claim 38, wherein the frame tree includes a first frame, a second frame, and a third frame, wherein the third frame is a parent frame of the first frame and second frame, and wherein the method steps further comprise:
determining a width of the third frame based on the greater width between the first frame and the second frame; and
determining a height of the third frame based on the greater height between the first frame and the second frame.

54. The program storage device of claim 38, wherein the method steps further comprise:
creating the window; and
wherein the step of creating the window is performed prior to determining a size and position of each control.

* * * * *

UNITED STATES PATENT AND TRADEMARK OFFICE
CERTIFICATE OF CORRECTION

| | | |
|---|---|---|
| PATENT NO. : | 5,886,694 | Page 1 of 5 |
| DATED : | March 23, 1999 | |
| INVENTOR(S) : | S.A. Breinberg et al. | |

It is certified that error appears in the above-identified patent and that said Letters Patent is hereby corrected as shown below:

| COLUMN | LINE | ERROR |
|---|---|---|
| [56] Pg. 1, col. 1 | Refs. Cited (U.S. Patents, Item 1) | "Seator" should read --Sleator-- |
| 1 | 15 | after "Wash." delete the second period |
| 1 | 31 | "Windows 95" should read --Windows®95-- |
| 2 | 26 | before "set of" insert --a-- |
| 4 | 7 | "FIG." should read --FIGS.-- |
| 5 | 11 | "Cancer" should read --Cancel-- |
| 6 | 61 | after "depicted" insert --as-- |
| 8 | 16 | "comer" should read --corner-- |
| 9 | 34 | "theses" should read --these-- |
| 10 | 33 | "pushbutton" should read --push-button-- |
| 13 | 20 | "indention" should read --indentation-- |
| 13 | 21 | "indention" should read --indentation-- |
| 14 | 19 | "comer" should read --corner-- |
| 14 | 35-36 | "describes generally" should read --generally describes-- |

UNITED STATES PATENT AND TRADEMARK OFFICE
CERTIFICATE OF CORRECTION

PATENT NO. : 5,886,694
DATED : March 23, 1999
INVENTOR(S) : S.A. Breinberg et al.

It is certified that error appears in the above-identified patent and that said Letters Patent is hereby corrected as shown below:

| | | |
|---|---|---|
| 15 | 12 | after "designation of" insert --a-- |
| 15 | 17 | "comers" should read --corners-- |
| 15 | 18 | "comers" should read --corners-- |
| 16 | 22 | "SetWidtbXX" should read --SetWidthXX-- |
| 16 | 24-25 | "SetmarginXX" should read --SetMarginXX-- |
| 16 | 49 | "ComboBox Frame" should read --ComboBox frame-- |
| 16 | 53 | "Control Frame" should read --Control frame-- |
| 16 | 66 | "SetWidthToFitPreexistingltems():" should read --SetWidthToFitPreexistingItems():-- |
| 17 | 31 | "SetWidtbDigits():" should read --SetWidthDigits():-- |
| 17 | 54 | "AlignChildrenNE ( )" should not break |
| 17 | 57 | "AlignchildrenSE( ):" should read --AlignChildrenSE( ):-- |
| 18 | 4 | "AlignChildrerNW( )" should read --AlignChildrenNW( )-- |

UNITED STATES PATENT AND TRADEMARK OFFICE
CERTIFICATE OF CORRECTION

PATENT NO. : 5,886,694
DATED : March 23, 1999
INVENTOR(S) : S.A. Breinberg et al.

It is certified that error appears in the above-identified patent and that said Letters Patent is hereby corrected as shown below:

| COLUMN | LINE | ERROR |
|---|---|---|
| 19 | 44 | "SetChildrenMarginX()" should read --SetChildrenMarginXX()-- |
| 19 | 51 | "SetMargin()" should read --SetMarginXX()-- |
| 19 | 54 | the line "Frame2.SetMargin (10)" should be double-indented |
| 19 | 55 | the line "Frame3.SetMargin (15)" should be double-indented |
| 19 | 56-57 | the paragraph beginning "The above method calls ..." should be indented |
| 20 | 45 | "SetMarginXX" should read --SetMarginXX( )-- |
| 20 | 51 | the line beginning "Tableframe<<Frame1..." should be double-indented |
| 20 | 52 | the line "Tableframe.Skip();" should be double-indented |
| 20 | 53 | the line "Tableframe<<Frame6;" should be double-indented |
| 21 | 5 | before "Container Frame" insert --The-- |
| 21 | 7 | "SetTopMargin()" should read --SetTopMarginXX()-- |

UNITED STATES PATENT AND TRADEMARK OFFICE
CERTIFICATE OF CORRECTION

PATENT NO. : 5,886,694
DATED : March 23, 1999
INVENTOR(S) : S.A. Breinberg et al.

It is certified that error appears in the above-identified patent and that said Letters Patent is hereby corrected as shown below:

| | | |
|---|---|---|
| 21 | 12-14 | the paragraph beginning "SetPerimeterMargin()..." should be indented |
| 21 | 12 | "SetPerimeterMargin()" should read --SetPerimeterMarginXX()-- |
| 21 | 13 | before "SetMarginXX()" insert --the-- |
| 21 | 18 | before "margin" delete "and" |
| 22 | 8 | "fmTruetypeText" should read --fmTrueTypeText-- |
| 22 | 43 | after "Vertical" insert --Frame-- |
| 22 | 43 | delete "and the Number", first occurrence |
| 23 | 18 | "horizontal Frame" should read --Horizontal Frame-- |
| 23 | 39 | "comer" should read --corner-- |
| 24 | 6 | "font" should read --fontFace-- |
| 24 | 50 | "fmfontSize" should read --fmFontSize-- |
| 24 | 51 | "font" should read --fontFace-- |
| 25 | 35-36 | "fmTru-eTypeText" should break as follows: --fmTrue-TypeText-- |

UNITED STATES PATENT AND TRADEMARK OFFICE
CERTIFICATE OF CORRECTION

PATENT NO. : 5,886,694
DATED : March 23, 1999
INVENTOR(S) : S.A. Breinberg et al.

It is certified that error appears in the above-identified patent and that said Letters Patent is hereby corrected as shown below:

| | | |
|---|---|---|
| 25 | 50 | "(upperh" should read --(upperH-- |
| 26 | 9 | "upperh" should read --upperH-- |
| 26 | 23 | "EffectsL" should read --effectsL-- |
| 26 | 26 | "effectsInteriorH" should read --effectsInteriorH-- |
| 26 | 43 | "FmOffset" should read --fmOffset-- |
| 26 | 60 | "finOffset" should read --fmOffset-- |
| 27 | 27 | "parenthesis" should read --parentheses-- |
| 27 | 50 | "Windows 95" should read --Windows®95-- |
| 27 | 57-58 | "Windows 95" should read --Windows®95-- |

Signed and Sealed this

Sixth Day of June, 2000

Attest:

Q. TODD DICKINSON

*Attesting Officer*         *Director of Patents and Trademarks*